United States Patent
Basso et al.

(10) Patent No.: US 9,189,076 B2
(45) Date of Patent: *Nov. 17, 2015

(54) METHOD AND APPARATUS FOR CONTROLLING MULTI-EXPERIENCE TRANSLATION OF MEDIA CONTENT

(71) Applicant: AT&T Intellectual Property I, LP, Atlanta, GA (US)

(72) Inventors: Andrea Basso, Turin (IT); Tara Hines, New York, NY (US); Aleksey Ivanov, Middletown, NJ (US); Jeffrey Mikan, Atlanta, GA (US); Nadia Morris, Pacifica, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/568,709

(22) Filed: Dec. 12, 2014

(65) Prior Publication Data

US 2015/0097770 A1    Apr. 9, 2015

Related U.S. Application Data

(63) Continuation of application No. 13/207,927, filed on Aug. 11, 2011, now Pat. No. 8,942,412.

(51) Int. Cl.
*G06K 9/00*      (2006.01)
*G06F 3/01*      (2006.01)

(52) U.S. Cl.
CPC ....................................... *G06F 3/017* (2013.01)

(58) Field of Classification Search
None
See application file for complete search history.

(56) References Cited

U.S. PATENT DOCUMENTS

| | | |
|---|---|---|
| 5,252,951 A | 10/1993 | Tannenbaum |
| 5,572,635 A | 11/1996 | Takizawa et al. |
| 6,172,719 B1 | 1/2001 | Kim |
| 6,466,234 B1 | 10/2002 | Pyle et al. |
| 6,912,429 B1 | 6/2005 | Bilger |
| 7,092,037 B2 | 8/2006 | Huh et al. |
| 7,613,310 B2 | 11/2009 | Mao |
| 7,680,295 B2 | 3/2010 | Yoda |
| 7,805,017 B1 | 9/2010 | Basso et al. |
| 7,843,486 B1 | 11/2010 | Blair et al. |
| 8,091,038 B1 | 1/2012 | Johnson et al. |
| 8,138,930 B1 | 3/2012 | Heath |
| 8,207,846 B2 | 6/2012 | Van Hoff et al. |
| 8,324,826 B2 | 12/2012 | Verberkt et al. |
| 8,346,376 B2 | 1/2013 | Engelen et al. |

(Continued)

OTHER PUBLICATIONS

"PlayStation 3 System Software User's Guide", Jan. 13, 2007; Playstation.net; pp. 1 -2.

(Continued)

*Primary Examiner* — Atiba O Fitzpatrick
(74) *Attorney, Agent, or Firm* — Guntin & Gust, PLC; Ed Guntin

(57) ABSTRACT

A method or apparatus for controlling a media device using gestures may include, for example, modifying media content to generate first updated media content according to a comparison of first information descriptive of a first environment of the source device to second information descriptive of a second environment of the recipient device, capturing images of a gesture, identifying a command from the gesture, and modifying the first updated media content to generate second updated media content according to the command. Other embodiments are disclosed.

20 Claims, 14 Drawing Sheets

(56) References Cited

U.S. PATENT DOCUMENTS

| | | |
|---|---|---|
| 8,403,105 B2 | 3/2013 | Lee et al. |
| 8,463,408 B2 | 6/2013 | Boleko Ribas |
| 8,560,955 B2 | 10/2013 | Jana et al. |
| 8,565,905 B2 | 10/2013 | Engelen |
| 8,634,597 B2 | 1/2014 | Ivanov et al. |
| 8,780,161 B2 | 7/2014 | Samadani et al. |
| 2002/0180973 A1 | 12/2002 | MacKinnon et al. |
| 2005/0120128 A1 | 6/2005 | Willes et al. |
| 2005/0275626 A1 | 12/2005 | Mueller et al. |
| 2007/0121958 A1 | 5/2007 | Berson |
| 2007/0146494 A1 | 6/2007 | Goffin et al. |
| 2007/0257928 A1 | 11/2007 | Marks et al. |
| 2008/0021963 A1 | 1/2008 | Jana et al. |
| 2008/0235587 A1 | 9/2008 | Heie et al. |
| 2008/0316372 A1 | 12/2008 | Xu et al. |
| 2008/0318683 A1 | 12/2008 | Rofougaran et al. |
| 2009/0046140 A1 | 2/2009 | Lashmet et al. |
| 2009/0195670 A1 | 8/2009 | Koishi |
| 2009/0253512 A1 | 10/2009 | Nickell et al. |
| 2009/0262946 A1 | 10/2009 | Dunko |
| 2009/0300525 A1 | 12/2009 | Jolliff et al. |
| 2010/0004918 A1 | 1/2010 | Lee et al. |
| 2010/0049476 A1 | 2/2010 | Engelen et al. |
| 2010/0079426 A1 | 4/2010 | Pance et al. |
| 2010/0090617 A1 | 4/2010 | Verberkt et al. |
| 2010/0125800 A1 | 5/2010 | Jana et al. |
| 2010/0134050 A1 | 6/2010 | Engellen et al. |
| 2010/0283393 A1 | 11/2010 | Boleko Ribas |
| 2010/0284525 A1 | 11/2010 | Sander et al. |
| 2010/0299445 A1 | 11/2010 | Amsterdam et al. |
| 2010/0302138 A1 | 12/2010 | Poot et al. |
| 2010/0318201 A1 | 12/2010 | Cuppen et al. |
| 2011/0109250 A1 | 5/2011 | Engelen |
| 2011/0204793 A1 | 8/2011 | Gardner, Jr. |
| 2011/0232989 A1 | 9/2011 | Lee et al. |
| 2012/0019633 A1 | 1/2012 | Holley |
| 2012/0099641 A1 | 4/2012 | Bekiares et al. |
| 2012/0135783 A1 | 5/2012 | Sams |
| 2012/0224019 A1 | 9/2012 | Samadani et al. |

OTHER PUBLICATIONS

Kansal, Aman , "Biuetooth Primer", 30 pages (2002) available at http://www .eng. wayne.edu~smahmud/BiuetoothWeb/BT ooth Tutorial.pdf.

Lee, Johnny C. et al., "Automatic projector calibration with embedded light sensors", In Proceedings of the 17th annual ACM symposium on User interface software and technology, ACM, 2004, 123-126.

Wiley, M. , "Logitech Cordless Action Controller Review", Jun. 10, 2004; IGN.com; pp. 1-9.

800

900

1100

1300

METHOD AND APPARATUS FOR CONTROLLING MULTI-EXPERIENCE TRANSLATION OF MEDIA CONTENT

CROSS-REFERENCE TO RELATED APPLICATIONS

This application is a continuation of and claims priority to U.S. patent application Ser. No. 13/207,927, filed Aug. 11, 2011. All sections of the aforementioned application are incorporated herein by reference.

FIELD OF THE DISCLOSURE

The present disclosure relates generally to media content and more specifically to a multi-experience translation of media content

BACKGROUND

Media content is generally experienced by consumer via media devices such as computers, televisions, radios, and mobile electronics. Media content is frequently delivered by service providers, who send media content, such as television programming, radio, and video, directly to consumers for enjoyment at their physical location. Service providers also often provide access to the internet and to internet-based media content, such as websites, games, social networking, and virtual-reality applications. Consumer media content experiences can be affected by their sensory environment. Consumers frequently control media devices by way of user interfaces such as keyboards, touch pads, touch screens, mice, input devices, and voice recognition.

DETAILED DESCRIPTION

Figure 1:
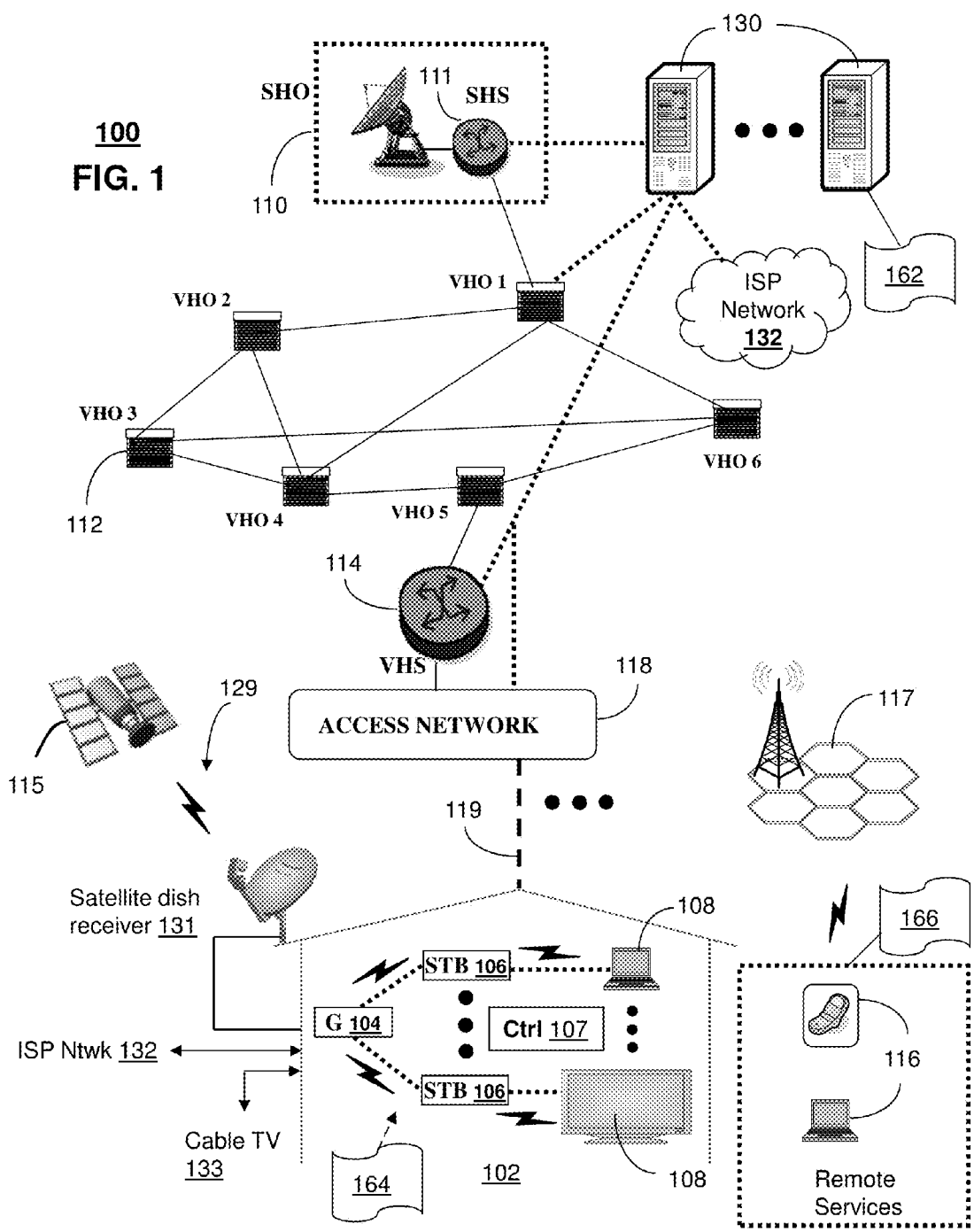
FIGS. 1-2 depict illustrative embodiments of communication systems that provide media services.

The present disclosure describes, among other things, illustrative embodiments for controlling media devices by way of gestures. In one embodiment, video of user movements captured at a media device are used to identify gestures that correspond to commands to the media device. In one embodiment, an adaptation of media content based on an environment of the media device can be further adapted according to a gesture-derived command. Other embodiments are contemplated by the present disclosure.

One embodiment of the present disclosure includes a media device having a memory, a media presentation element for presenting media content at the media device, and an image sensor for capturing images. The media device also includes a processor coupled to the memory, the media presentation element, and the image sensor. The processor can be operable to retrieve a plurality of sensory information descriptive of an environment of a media device. The processor can also be operable to identify a plurality of characteristics of the environment of the media device according to the plurality of sensory information. The processor can further be operable to select a first adaptation for modifying a presentation of media content at the media presentation element according to the plurality of characteristics of the environment of the media device. The processor can be operable to modify a presentation of media content by the media presentation element according to the first adaptation to generate a first modified presentation of the media content. The processor can also be operable to capture video of a user movement at the media device. The processor can further be operable to identify a gesture from the captured video of the user movement by image recognition. The processor can be operable to identify a command from the identified gesture. The processor can also be operable to select a second adaptation for modifying the presentation of the media content at the media presentation element according to the command. The processor can further be operable to modify the first modified presentation of the media content according to the second adaptation to generate a second modified presentation of the media content One embodiment of the present disclosure includes a computer-readable storage medium having computer instructions that can receive media content from a source device, where the media content includes information describing a first environment of the source device. The computer instructions can modify the media content to generate first updated media content according to a comparison of the information describing the first environment of the source device and information descriptive of a second environment. The computer instructions also can capture images of a user movement. The computer instructions further can identify a gesture from the captured images of the user movement. The computer instruction can identify a command corresponding to the gesture. The computer instructions can also modify the first updated media content according to the command to generate second updated content. The computer instruction can further present the second updated media content.

One embodiment of the present disclosure includes a method where media content supplied by a source device is received at a recipient device. The media content is modified to generate first updated media content according to a comparison of first information descriptive of a first environment of the source device to second information descriptive of a second environment of the recipient device. Images of a gesture are captured. A command is identified from the gesture. The first updated media content is modified to generate second updated media content according to the command.

This application is related to U.S. patent application Ser. No. 13/185,487, filed Jul. 18, 2011, by Basso et al., entitled "Method and Apparatus for Multi-Experience Adaptation of Media Content," is being simultaneously filed forthwith. All sections of the aforementioned application are incorporated herein by reference.

This application is related to U.S. patent application Ser. No. 13/185,493, filed Jul. 18, 2011, by Basso et al., entitled "Method and Apparatus for Multi-Experience Translation of Media Content with Metadata." All sections of the aforementioned application are incorporated herein by reference.

This application is related to U.S. patent application Ser. No. 13/208,037, filed Aug. 11, 2011, by Basso et al., entitled "Method and Apparatus for Multi-Experience Metadata Translation of Media Content with Sensor Sharing." All sections of the aforementioned application are incorporated herein by reference.

FIG. 1 depicts an illustrative embodiment of a first communication system 100 for delivering media content. The novel communication system 100 can capture a user movement and compare the captured user movement to a set of stored gestures via image recognition. The communication system 100 can also determine if the captured user movement matches a stored gesture. If a match is determined, then the novel communication system 100 can retrieve a command corresponding to the identified gesture. The communication system can further perform the command. The communication system can collect sensory data characterizing environments at a source device and a recipient device. The communication system 100 can compare the environmental characteristics of the source device with environmental characteristics at the recipient device to detect differences. The communication system 100 can use these differences to modify presentation of the media content from the source device that can be delivered at the recipient device. The communication system 100 can use a command identified from a user movement to control the modification of the presentation of the media content.

The communication system 100 can represent an Internet Protocol Television (IPTV) media system. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered communication technologies (such as coaxial, power line or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the present disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or portable communication devices 116.

Multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the present disclosure.

Communication system 100 can also provide for all or a portion of the computing devices 130 to function as a media content adaptation server (herein referred to as server 130). The server 130 can use common computing and communication technology to perform function 162, which includes among things, modification of media content in accordance with a consumer's environment. The novel communication system 100 can capture a user movement and compare the captured user movement to a set of stored gestures via image recognition. The communication system 100 can also determine if the captured user movement matches a stored gesture. If a match is determined, then the novel communication system 100 can retrieve a command corresponding to the identified gesture. The communication system can further perform the command. The server 130 can be used to receive sensory data representing characteristics of an environment of a source device, such as one of the media processors 106, media devices 108, or portable communication devices 116. The server 130 can also be used to receive sensory data representing characteristics of an environment of a recipient device, such as another of the media processors 106, media devices 108, or portable communication devices 116. The server 130 can further be used to determine differences between the characteristics of the first and second sensory environments. The server 130 can be used to modify a presentation of media content according to the differences between the characteristics of the first and second sensory environments. The server 130 can further be used to provide the modified media content to the recipient device over the communication system 100. The media processors 106 and portable communication devices 116 can be adapted with software functions 164 and 166, respectively, to further utilize the services of the server 130. In one embodiment, the media processors 106 and portable communication devices 116 can be adapted to execute software functions 164 and 166, respectively, to collect and report sensory data to the server 130 representing characteristics of the environments of the media processors 106 and portable communication devices 116, respectively.

Figure 2:
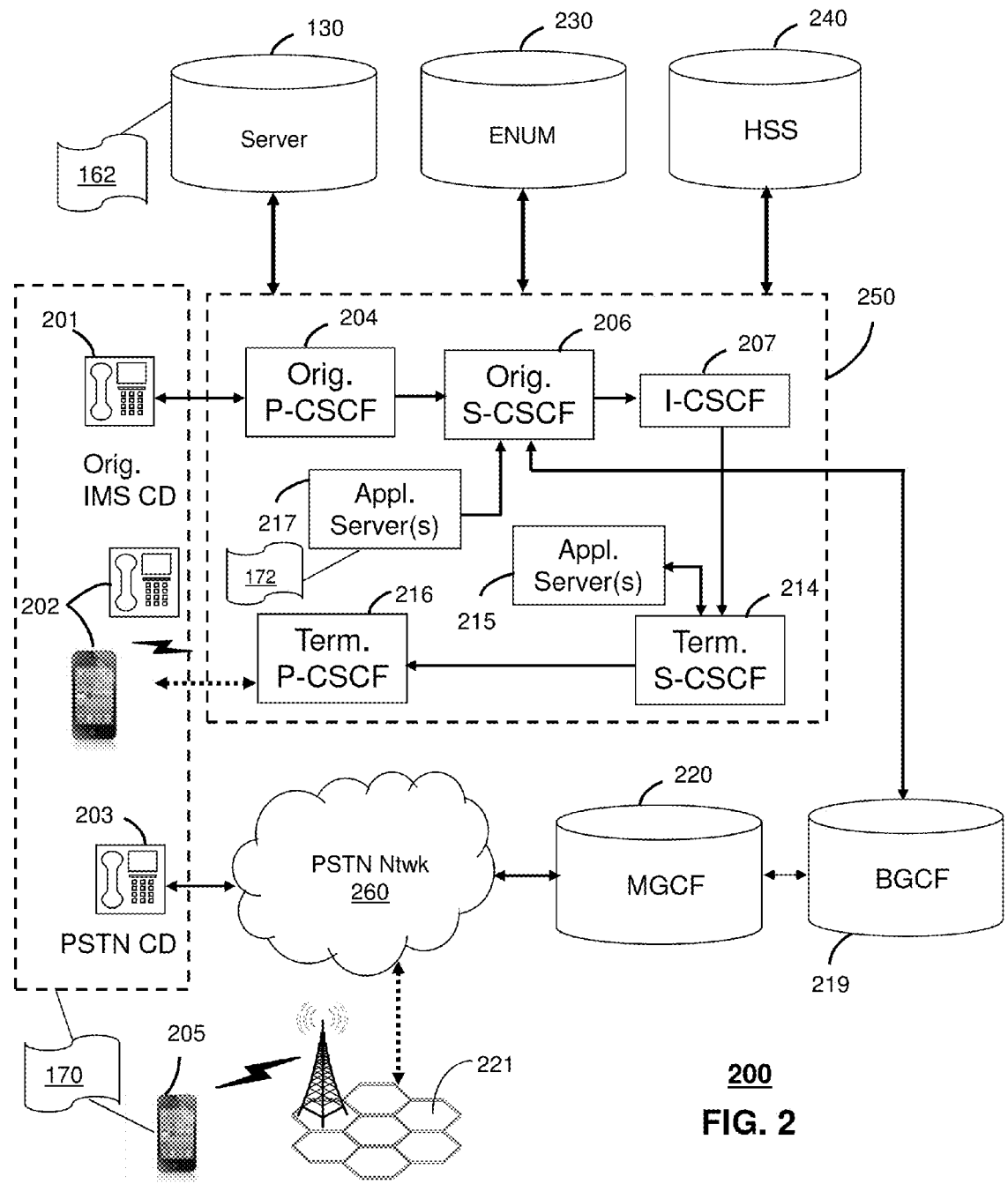

FIG. 2 depicts an illustrative embodiment of a communication system 200 employing IP Multimedia Subsystem (IMS) network architecture to facilitate the combined services of circuit-switched and packet-switched systems. Communication system 200 can be overlaid or operably coupled with communication system 100 as another representative embodiment of communication system 100. The novel communication system 200 can be adapted to capture user movements, identify defined gestures matching the captured user movements, and retrieve commands corresponding to the defined gestures. The novel communication system 200 can also be adapted to collect sensory data characterizing environments at a source device and a recipient device and to compare the environmental characteristics of the source device with the environmental characteristics at the recipient device to detect differences. The novel communication system 200 can also be adapted to use these differences to modify presentation of the media content from the source device that can be delivered at the recipient device. The communications system can further be adapted to convert user movements into commands to control modification of the presentation of the media content.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1. It is further contemplated that the CDs of FIG. 2 can operate as wireline or wireless devices. In one embodiment, the CDs of FIG. 2 can be communicatively coupled to a cellular base station 117 such as shown in FIG. 1, a femtocell (not shown), a WiFi router, a DECT base unit, or another suitable wireless access unit to establish communications with the IMS network 250 of FIG. 2.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. Although not shown, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 121 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the present disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250.

Communication system 200 can include or otherwise be coupled with server 130 of FIG. 1 for purposes similar to those described above. It is further contemplated by the present disclosure that the server 130 can perform the function 162 and thereby provide a media content adaptation application for subscribers associated with CDs 201, 202, 203, and 205. CDs 201, 202, 203, and 205 can be adapted with software to perform function 170 to utilize and integrate with the multi-experience adaptation application performed by the server 130. It is further contemplated that the server 130 can be an integral part of the application server(s) 217, where the application server(s) 217 performs function 172, which can be substantially similar to function 162 and adapted to the operation of the IMS network 250.

Figure 3:
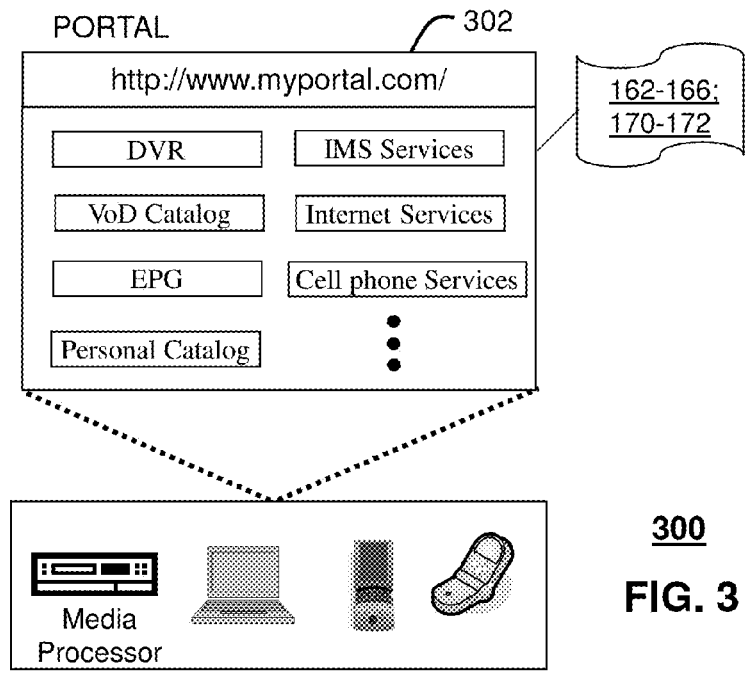
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the present disclosure that the web portal 302 can further be utilized to manage and provision software applications 162-172 of the devices of FIGS. 1-2, respectively, as described earlier.

Figure 4:
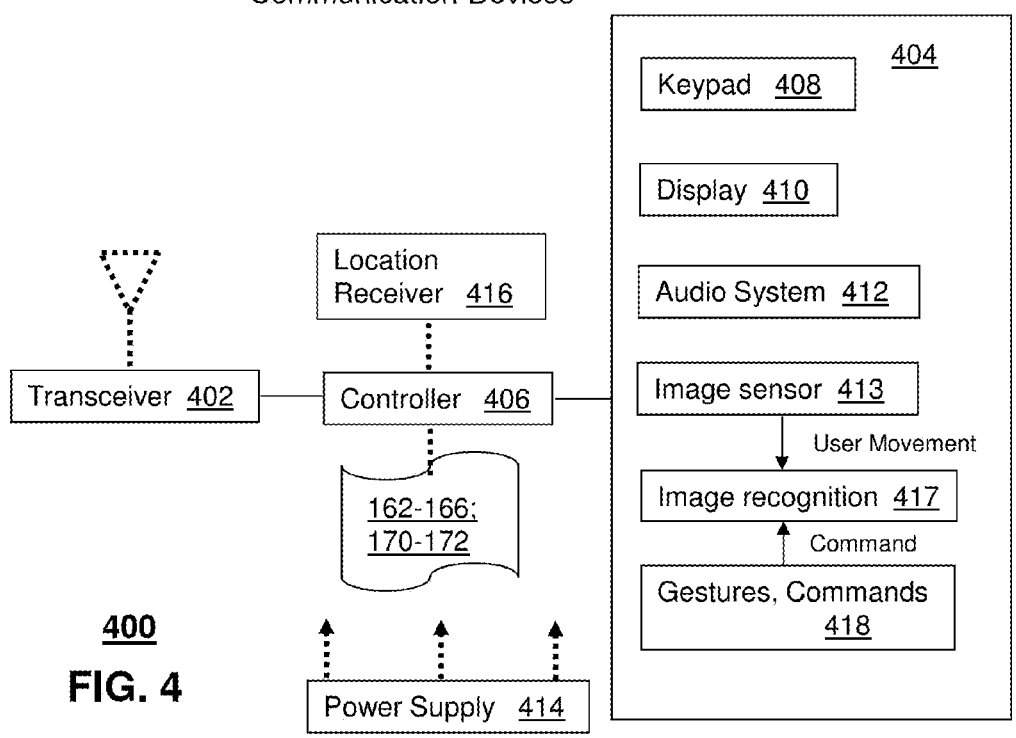
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the devices depicted in FIGS. 1-2. The novel communication device 400 can capture sensory data corresponding to environmental characteristics at the communication device. The novel communication device 400 can transmit the environmental characteristics to another communication device or to a server 100-200. The novel communications device 400 can adapt its graphical user interface to account for differences in environmental conditions. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting, for example, Bluetooth. The keypad 408 can represent a numeric keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications.

The UI 404 can further include an image sensor 413 such as a charged coupled device (CCD) camera for capturing still or moving images. In one embodiment, the image sensor 413 can be capable of capturing user movements, such as movements of a user's hands or arms or movements of a user's head, face, or facial features. The image sensor 413 can be built into another function of the UI 404. In one embodiment, the image sensor 413 can be included in the display 410. In another embodiment, the image sensor 413 can be a stand-alone device that is communicatively coupled to the UI 404.

The UI 404 can further include an image recognition system 417. The image recognition system 417 can compare a user movement captured by the image sensor to a set of gestures 418 that has been previously stored in the communication device 400. In one embodiment, the image recognition system 417 can be a computer program or routine. In one embodiment, the image recognition system 417 can be included in a server 130. The set of stored gestures can be a set of standard gestures 418 that can be provided to the device 400. In one embodiment, standard gestures are downloaded to the communication device 400 from a server 130 of a service provider over a communication system 100. In one embodiment, a set of standard gestures 418 can be built into the communication device 400. In one embodiment, the set of stored gestures 418 can include a set of custom gestures that have been defined on the communication device 400 or that have been developed and copied from a similar communication device 400.

After a user movement is captured, the user movement(s) can be compared against the set of stored gestures 418. When the captured user movement matches a stored gesture, then a command corresponding to that stored gesture is retrieved. For example, a wave of a user's hand can be defined as a gesture and can further be defined as a means for a user to command a closing of an open media file on the communication device 400. In that case, a wave of a user's hand will result in a captured user movement (video of the hand waving). The image recognition system 417 compares the capture user movement to the set of stored gestures 418. When the matching stored gesture (the hand wave gesture) is found, then the image recognition system 417 retrieves the predefined "close media file" command associated with the hand wave gesture.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation.

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Illustrative embodiments of methods that can operate in portions of the communication device of FIG. 4 are described below.

Figure 5:
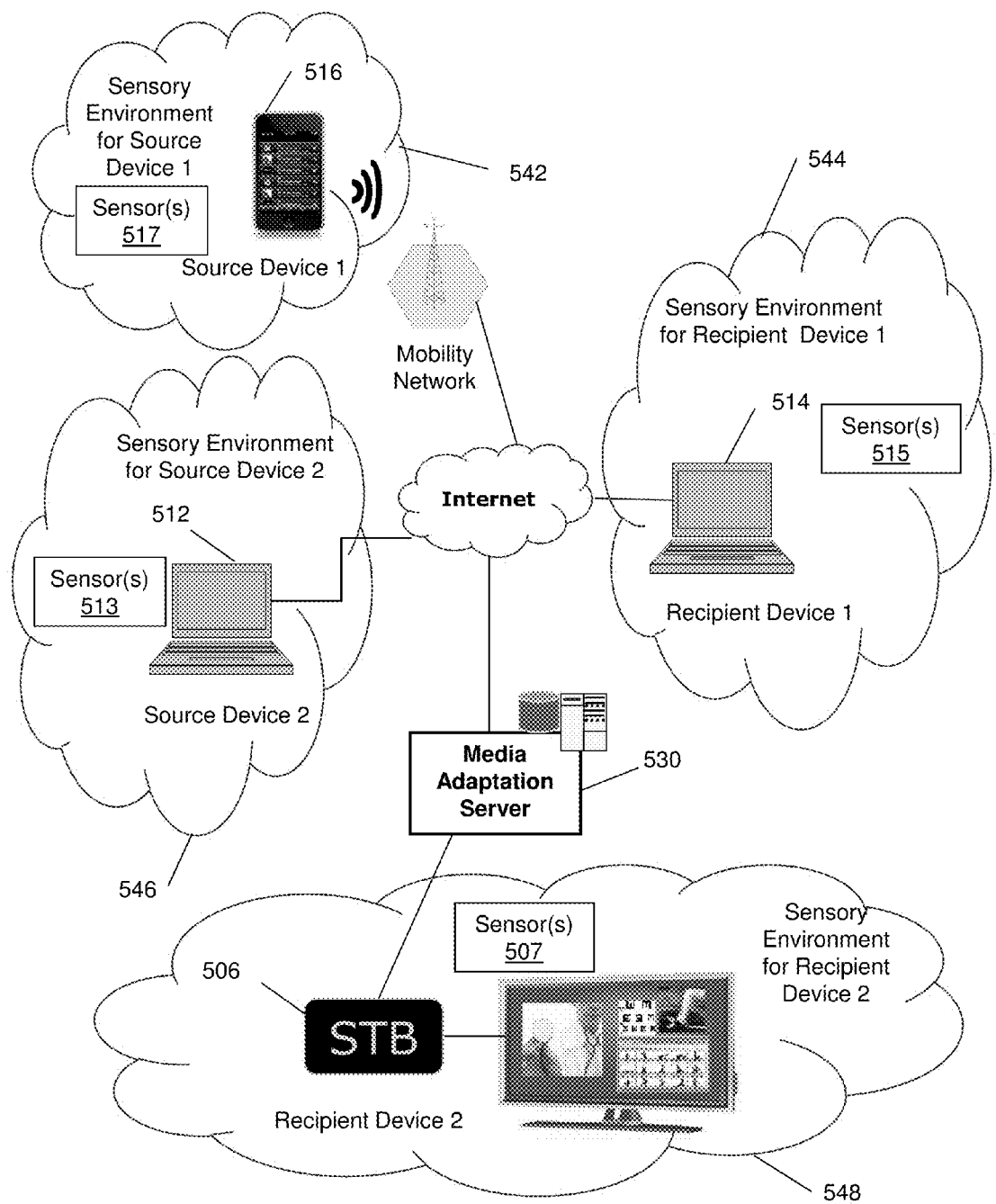
FIG. 5 depicts an illustrative embodiment of a system.

FIG. 5 depicts an illustrative embodiment of a system 500 for adaptation of media content in accordance with a user's sensory environment. System 500 can be overlaid or operably coupled to communication systems 100-200 as another representative embodiment of communication systems 100-200. System 500 can include a server 530 in communication with media processors 506 (such as set-top boxes), computing devices 512 and 514 (such as a laptop computer, tablet, etc.), and wireless communication devices 516 (such as mobile phones, smart phones, etc.). The mobile devices 516 can be communicatively coupled to the server 530 by way of a mobility network coupled to the Internet or other communication means. The computing devices 512 can also be communicatively coupled to the server 530 by way of the Internet or other communication means.

The present disclosure contemplates a server 530 that among other things is capable of modifying media content in accordance with a user's sensory environment. The server 530 can be used to receive first sensory data representing characteristics of an environment 542 of a first source device 516. The server 530 can also be used to receive second sensory data representing characteristics of a second sensory environment 544 of a first recipient device 514. The server 530 can further be used to determine differences between the characteristics of the environments 542 and 544 of the first source device 516 and the first recipient device 514. The server 530 can be used to receive media content from the first source device 516. The server 530 can further be used to modify a presentation of the media content according to the differences between the characteristics of the environments 542 and 544 of the first source device 516 and the first recipient device 514. The server 530 can further be used to provide the modified media content to the first recipient device 514 over the communication system 100. In one embodiment, the first source device 516 can be a wireless or mobile communications device coupled to the communications system 100 through a mobility network. The first recipient device 514 can be a computing device. In one embodiment, a second source device 512 can be a computing device while a second recipient device 506 can be a media processor, such as a set-top box, that presents the media content on a display device.

Each of environments 542-548 can comprise sensors 507, 513, 515 and 517 to provide server 530 sensor data. The sensors can be virtual or physical. In an embodiment where the sensors 507, 513, 515 and 517 are physical sensors, these sensors can utilize technology that provides the server 530 sensory information that includes without limitation temperature, weather, lighting, color, images, video, audio, location information, time, season of the year, aroma, and type of establishment from which the source or recipient device is operating. Virtual sensors can be an integral part of a virtual application operating in the source or recipient devices. A virtual application in the present context can represent a video game, virtual game such as Second Life™, an application including avatars, or a social media application. The virtual sensors can also provide the server 530 sensory information such as temperature, weather, lighting, color, images, video, audio, location information, time, season of the year, aroma, and type of establishment presented by the virtual application. Other forms of sensory data such a motion data (velocity, acceleration, etc.), orientation data (e.g., compass information) and other forms of virtual applications are contemplated by the present disclosure.

Figure 6:
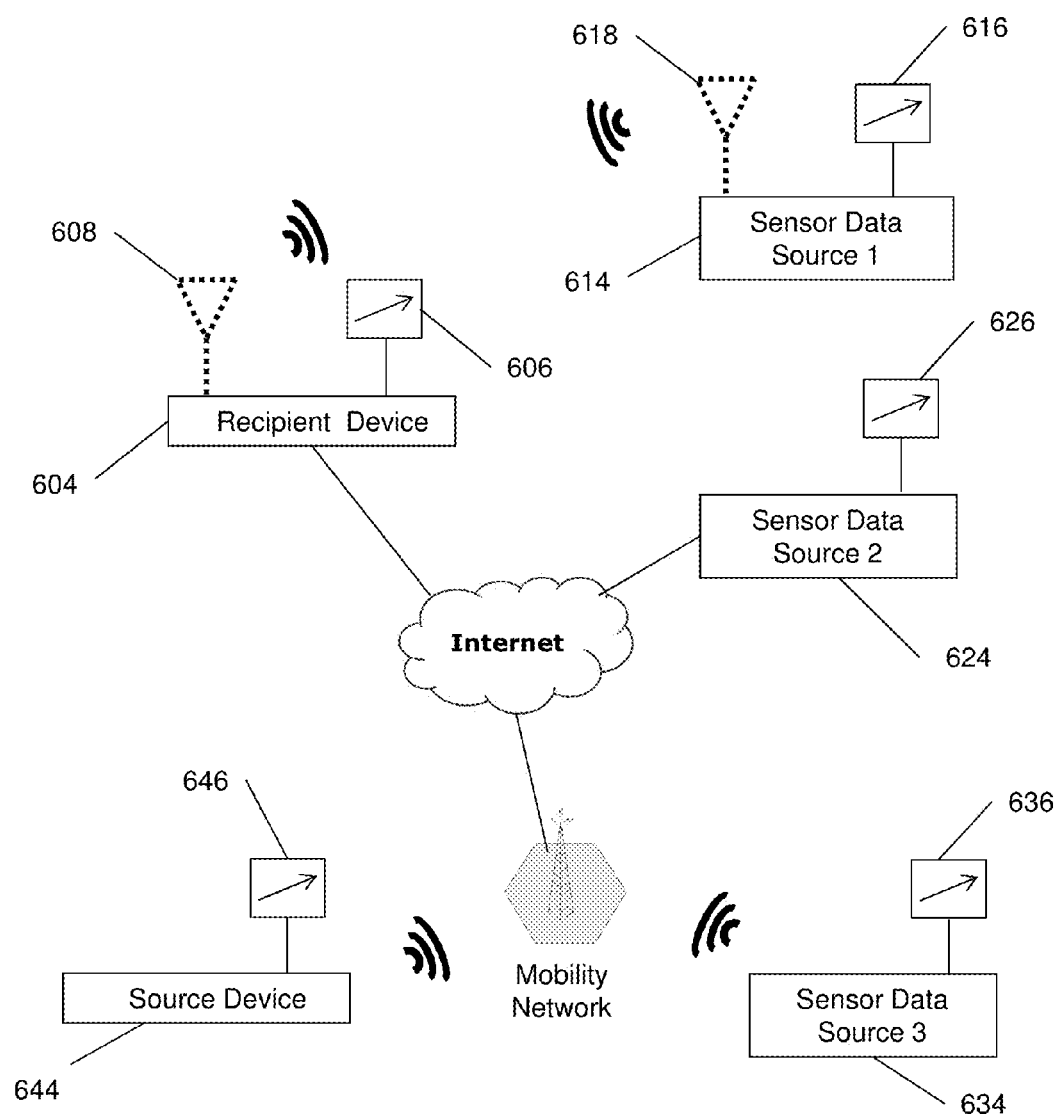
FIG. 6 depicts an illustrative embodiment of a system.

FIG. 6 depicts an illustrative embodiment of a system 600 for collecting sensory data from sense sources operating in the sensory environment of the source and recipient devices in accordance with a consumer sensory environment. System 600 can be overlaid or operably coupled to communication systems 100-200 as another representative embodiment of communication systems 100-200 or a portion of communication systems 100-200. It should be understood, for purposes of this illustration, that the source and recipient devices 644 and 604 are interchangeable, such that the source device 644 and the recipient device 604 can each capture or collect sensory data from the environment by way of similar capabilities as herein described.

The source and recipient devices 644 and 604 can capture sensory data from their respective locations by direct or indirect means. The source and recipient devices 644 and 604 can be directly coupled to sensors 646 and 606. The source and recipient devices 644 and 604 can be adapted to measure or sample data from sensors 646 and 604. In one embodiment, the recipient device 604 can use an analog-to-digital convertor to sample values at the sensor 420. In one embodiment, the sensor 606 can be a smart device such that sensory data can be captured by the recipient device via a digital communication link with the sensor. These sensors can utilize technology that provides the source and recipient devices 644 and 604 sensory information that includes without limitation temperature, weather, lighting, color, images, video, audio, location information, time, season of the year, aroma, and type of establishment from which the source or recipient device is operating.

The source and recipient devices 644 and 604 can collect sensory data from their environment, by indirect means, through communication with a sensor data source. Sensor data sources 614, 624, and 634 can be single-purpose or multi-purpose devices. For example, the recipient device 604 can be located near a sensor data source 614 that is a stand-alone light sensor. The sensor data source 614 can include a sensor 616, such as photodiode, capable of capturing light intensity at the location. The sensor data source 614 can further include a "smart" capability for capturing a light intensity signal from the sensor 616 and converting the light intensity signal to digital data. The sensor data source 614 can include a one-way (sending only) or a two-way (sending and receiving) wireless communication capability 618 for communicating the digital light intensity data to other devices, such as the recipient device 604 by way of a wireless communication capability 608 of the recipient device. The sensor data source 614 can be used for another purpose. For example, the aforementioned stand-alone light sensor data source 614 can be applied to a building as an input of a security system that automatically controls lighting and other security settings based on the digital light intensity data reported from the light sensor data source 614. In this case, the building system security system is the primary user of the light sensor data source 614 while the recipient device 604 can access the digital light intensity data from the light sensor data source 614 as a secondary, and perhaps temporarily, when the recipient device 604 is near the location of the light sensor data source 614. In this way, the recipient device 604 can benefit from access to light intensity data for use in modifying a media presentation without incurring the overhead for sensing light intensity.

Sensor data sources 614, 624, and 634 can be also incorporated into other devices. In one embodiment, a sensor data source 634 can be a mobile communication device, such as a mobile phone. An audio sensor 636 (microphone) can be built into a mobile communication device, for use in cellular communication. The audio sensor can also be used to capture background audio intensity in the environment where the mobile communication device is located. In this case, the sensor data source 634 has a primary use as a mobile phone and secondary use as a sensor data source for another device, such as the source device 644. In one embodiment, whenever the mobile phone sensor data source 634 is not being used for cellular communication or for other user activities such as recording audio or video, the audio sensor 636 can be made available for use by other nearby devices, such as the source device 644. The mobile phone sensor data source 634 can capture an audio signal from the audio sensor 636 and convert this into a digital audio signal. In one embodiment, the digital audio signal can be a "live" audio signal, such that it contains a representation of the actual audio occurring at the mobile phone sensor data source 634. In one embodiment, the digital audio signal can merely be an intensity signal that filters out discernable audio content. The mobile sensor data source 634 can share the digital audio data with the source device 644 over a mobility network. In one embodiment, the mobile sensor data source 634 can share the digital audio data with another device, such as the recipient device 604, by way of an internet link or a wired network.

By receiving sensory data from sensor data sources 614, 624 and 634 sharing the same environment, the source device 644 or recipient device 604 can collect substantial environmental sensory information. Sharing of sensory data can be via cooperative agreements or opt-in agreements where devices are enrolled by their service provider and are obligated to share sensory data with other devices unless opted out. The sensor data sources 614, 624, and 634 can be other media processors 106 or portable communication device 116 within the communication system 100.

Figure 7:
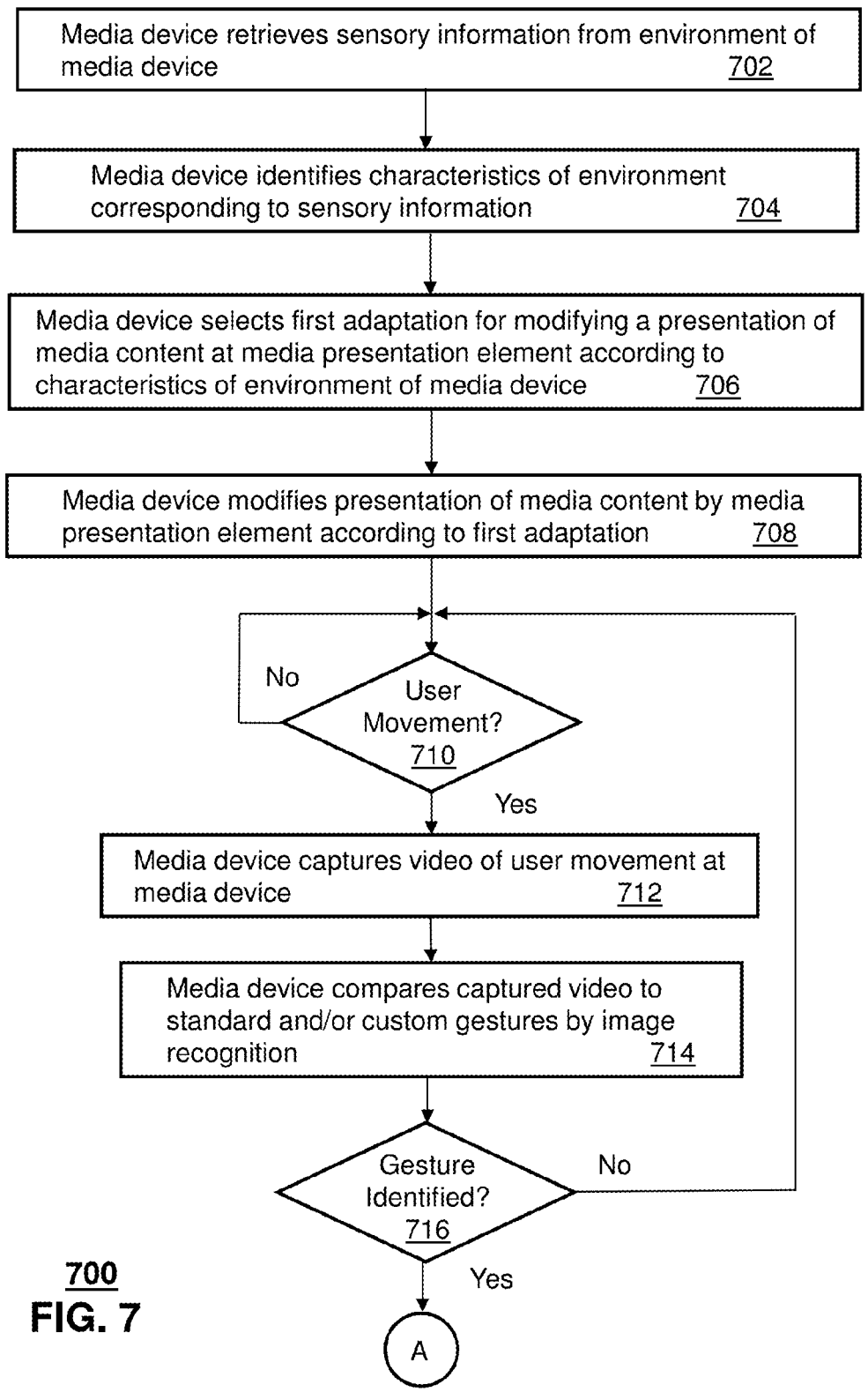
FIGS. 7-15 depict illustrative embodiments of methods operating in portions of the systems described in FIGS. 1-6.
Figure 8:
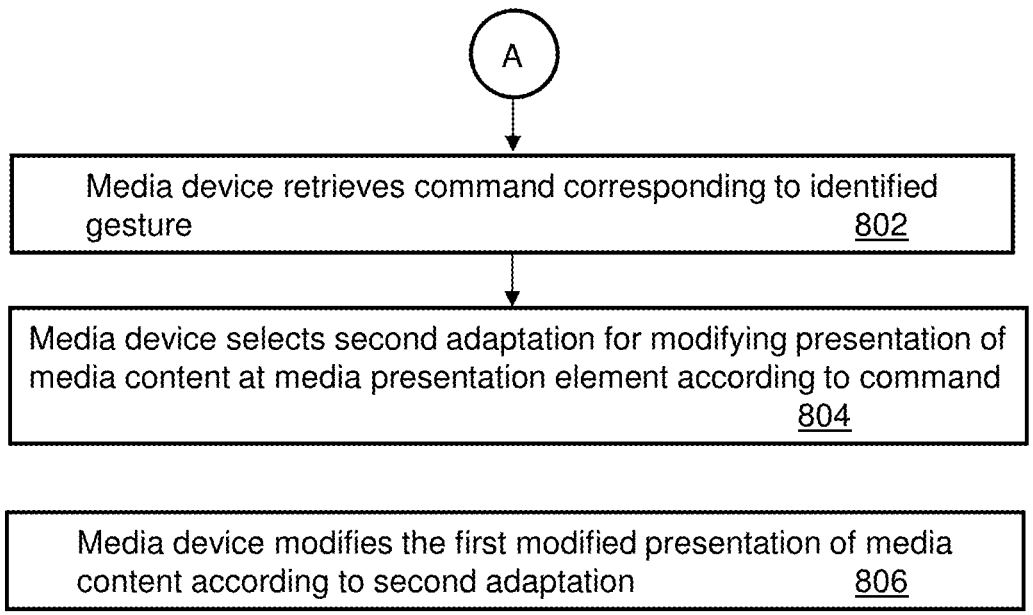

FIGS. 7-8 depict an illustrative method 700-800 that operates in portions of the devices of FIGS. 1-6. Method 700-800 can begin with step 702 in which a media device retrieves sensory information from an environment of the media device. The media device can be a media processor 106, such as a set-top box. A media processor 106 can be connected to the communication system 100 via a gateway 104. A media processor 106 can deliver media content from the communication system 100 to a media device 108, such as a television or a computing device. The media device can be a portable communication device 116, such as a computing device, wireless computing device, or mobile communications device, and can receive media content from the communication system 100 via a mobility network. The media device can be a source device 512, 516 or a recipient device 506, 514. For ease of illustration, the media device will be referenced herein as media device 506, 512 to indicate that the media device can be either a recipient device or a source device.

Sensory data can represent an environment 542, 546 of the media device 506, 512. Sensory data representing characteristic of the environment of the source or recipient device can be derived from a "world" in which the device is operating. This "world" can be a physical world or a virtual world. A physical world for a source or recipient device can be described as environmental conditions that can be physically experienced by one consuming media content at the source or recipient device. The sensory data can be derived in a physical environment from sensors 507, 513, 515 and 517 described earlier. A virtual world for a source or recipient device can be described as environmental conditions presented by the source or recipient device for a consumer of virtual content to virtually experience. Physical and virtual worlds and the collection, distribution, and use of sensory data representing a physical or virtual environment are further described below with respect to a media device 506, 512.

The physical world can be described as a collection of environmental conditions and can be assessed by measuring and collecting sensory data representing these environmental conditions. In one embodiment, sensory data can represent sensory information relating to lighting, temperature, colors, background audio, video, images, and location details, such as room spatial features, time-zone, season, and type of establishment (home or commercial enterprise). The media device 506, 512 can be described as operating in a sensory environment 548, 546 that includes a compilation of sensory data for the physical world of the source device. In one embodiment, temperature, light intensity, and colorimetric data, aromatic data, background audio, video, and still images, and location information can be collected at the media device 506, 512. Sensory data for the sensory environment 548, 546 can be captured and/or compiled by sensors 507, 513 operating in the media device 506, 512, or by other devices coupled to the communication system 100, or by a combination of both. Sensory data can detect characteristics, such as sound levels or lighting, that are consistent with of home or commercial environments to thereby detect and report a type of establishment.

The sensory data of the physical environment for a source device 512, 516 can be translated into a standard format before being communicated to a recipient device 506, 514 or to the media adaptation server 530. In one embodiment, raw temperature data can be initially collected at the source device 512, 516 by direct sensing using a thermo probe. The raw temperature data can be converted into a series of digital readings, statistically converted to a mean temperature or median temperature or range of temperatures as needed. A single temperature, such as the mean or median, or a temperature range can then be reported from the source device 512, 516 and received at the recipient device 506, 514, or server 530. A similar approach can be used for other sensory data, such as light intensity, colorimetric data, aromatic data, or volume of background sound or audio.

The sensory data of the physical environment for the media device 506, 512 can include audio, video, and still images. For example, a painting might appear on a wall at the location of the source device 512, 516. This painting represents a sensory aspect of the physical environment that can be replicated exactly or in modified form at a recipient device 506, 514. In one embodiment, the painting image can be captured at the media device 506, 512, by means of, for example, a camera device. The captured image can be saved as an image file, such as a Joint Photographic Experts Group, or JPEG, image file, or as another image file format. Similarly, background audio content, such as recorded or live music or soundtrack, ambient noise, or any combination of sound present at the media device 506, 512, can be captured by means of, for example, a microphone device. The captured sound can be saved as a sound file, such as a Moving Picture Experts Group, or MPEG, sound file, or as another image file format. Similarly, background video or a combination of video and audio or of video, audio, and still images can be captured at the source device. In one embodiment, a video camera or a combination of a video camera and microphone could be used to capture video of the environment of the media device 506, 512. Video data can be saved as MPEG video files.

The sensory data of the physical environment for the media device 506, 512 can include location information. In one embodiment, the location of the source device 512, 516 can be captured by accessing Global Positioning System (GPS) satellite services. If the media device 506, 512 is physically attached to the communication system 100, then its location can be determined by reference to the location of other entities of known locations. In one embodiment, if the media device 506, 512 is connected to a router in a building of known location, then the location of the building can be reported as the location. If the media device 506, 512 accesses the communication system via a component of a mobility network 117, such as specific cell tower, then the location of the mobility network component can be used.

The sensory data of the physical environment of a source device 512, 516 can be provided to a recipient device 512, 514 or a media adaptation server 530. The sensory data can be sent as streaming data, files, or messages. The sensory data can be continuously updated or can be periodic snapshots of environmental conditions. In one embodiment, temperature can reported each hour or can reported continuously with each data transmission. Video data can be sent as a continuous stream or can be converted into a series of still image snapshots to conserve system bandwidth.

Sensory data representing a virtual "world" of a media device 506, 512 can include environmental components that can be experienced virtually by one consuming virtual media content at the media device 506, 512. A virtual world can be an environment that is presented by the media device 506, 512 as part of some type of virtual media content. Virtual media content can include video game applications, virtual world applications, applications that include avatars, social media applications, and websites. Virtual media content can incorporate scenarios, perspectives, and role-playing attributes that allow a consumer of the virtual media content to mentally experience various aspects of another world, persona, or reality. Virtual media content can include virtual representations of otherwise physical phenomena, such as lighting, temperature, color, aroma, sound, movement, video, images, and spatial relationships. This "virtual" sensory data imitates physical phenomena within a virtual context to bring a sense or "realness" to the experience for the consumer.

Virtual sensory data representing components of the virtual environment can be available at the media device 506, 512 as digital data that is accessed by a video game or virtual world application executing on the source device. This virtual sensory data for the virtual environment can be accessible by the game or application from graphics data files, MPEG files, JPEG files, and parameter files. The virtual sensory data can also be accessible to the media device 506, 512 by accessing or parsing these files as saved in local storage or as made available from a network source. The media device 506, 512 can be used as a display device that merely reproduces graphics and audio from a data stream. In such a case, the virtual sensory data can be collected by monitoring run-time data variables available through the operating system of the media device 506, 512 or available from a graphic card or an audio card.

The sensory data representing the environment of a source device 512, 516 can be sent to a recipient device 506, 514 and/or to a server 530. The sensory data can be sent by way of a "pushing" scheme, where data is broadcast or reported from the source device 512, 516 to the recipient device 506, 514 or server 530 as determined by the source device. The sensory data can be sent by way of "pulling" scheme, where data is only sent to the recipient device and/or server 530 when requested by the recipient device and/or server.

In step 704, the media device identifies characteristics of the environment of the media device 506, 512 corresponding to the sensory information. In one embodiment, the media device 506, 512 can determine a mean value or a range of values for temperature based on captured temperature data. The media device 506, 512 can convert captured video into a standard file format or into a series of still images.

In step 706, the media device 506, 512 selects a first adaptation for modifying a presentation of the media content by the media presentation element of the media device according to the characteristics of the environment of the media device. In step 708, the media device 506, 512 can modify the presentation of the media content by the media presentation element of the media device according to the first adaptation. The media presentation element can be a part of user interface 404 of the media device 506, 512. The media presentation element can be a combination of hardware and/or software components that can allow a user of the device to experience the media content by way of, for example, seeing, hearing, feeling, or tasting the media content or a derivative of the media content. For example, the device can include software to reproduce video and audio content, encoded as a data file or a data stream, as video images that are visible on a display 410 and as audio that is audible on an audio system 412. The device can have several different media presentation elements. Some of the media presentation elements can be specialized to reproduce content only from specific formats of media content files or data streams, while other media presentation elements can reproduce from several formats or encoding schemes.

The media content can be any combination of text, audio, still images, video, three-dimensional images and video, graphics, or computer-generated media, and virtual gaming or avatar-based content. The media content can be associated with television programming, movies, concerts, news, books, articles, audio communication, text messaging, SMS, instant messaging, weather reports, programming information, community information, captioning, video game applications, virtual world applications, applications including avatars, social media applications, and websites. The media content can originate at a source device 512, 516 or from service provider(s) of the communication networks 100-200. A service provider can provide limited services, such as only providing media programming, or can provide broad-based services, such as media programming, cellular phone, internet access, and on-demand services. These services can serve as an originating point for all or part of the media content at a source device 512, 516.

The media device 506, 512 can modify characteristics of a display 410 on a user interface 404 of the media device or of a user interface, such as display 508, in communication with the media device. For example, the media device 506, 512 can be located in dark conditions. The media device 506, 512 can detect the environment and adjusts settings on the display 404, 508, such as brightness, backlighting, or contrast. The media device 506, 512 can adjust an audio system 412 to account for background noise at the media device.

If the media device 506, 512 detects a user movement in step 710, then the media device can capture video of the user movement at the media device in step 712. In one embodiment, an image sensor 413 of a user interface 404 can be capable of capturing user movements. Movements of a user's hands, arms, head, face, or facial features can be captured. Full body movements, such as standing up, sitting down, walking, or jumping can be captured. The captured user movements can be associated with defined gestures that can be detected by the media device 506, 512. For example, a user movement of standing can be defined as a gesture that can command the media device 506, 512 to shut down the media device or to put the media device into a standby state. Alternatively, a user movement of standing can be an undefined movement that is not to be interpreted as a gesture by the media device 506, 512.

In step 714, the media device 506, 512 compares the captured video of the user movement at the media device to a set of gestures 418. In one embodiment, an image recognition system 417 in the media device 506, 512 can compare a user movement captured by the image sensor to a set of gestures 418 that has been previously stored in the media device. In one embodiment, the image recognition system 417 can be a computer program or routine. In one embodiment, the image recognition system 417 can be included in a server 530. In one embodiment, the image recognition system 417 can compare the captured video of the user movement to the set of stored gestures 418 by comparing the captured video stream to previously captured video streams for each gesture. In one embodiment, the captured video can be compared to still images, or screen captures, of the stored gestures. In this case, the gestures are stored as one or more still images. In one embodiment, the capture video of the user movement can be converted to one or more still images that represent characteristic components of the user movement. The one or more still images of the captured video of the user movement can then be compared to one or more stored still images of the gestures.

The set of stored gestures 418 can be a set of standard gestures that can be provided to the device 400. In one embodiment, standard gestures are downloaded to the media device 506, 512 from a service provider over a communication system 100. For example, the standard gestures are downloaded to the media device 506, 512 using a server 530. In one embodiment, a set of standard gestures 418 can be built into the media device 506, 512.

The standard gestures 418 can be in the form of a standard gesture library. In one embodiment, standard gestures can be distinct, elemental movements that can be combined to create more complex standard gestures in a way that mimics how words can be made from letters or how sentences can be made from words. For example, a pointing an index finger can be a first elemental movement that defines a first gesture. Moving a pointed index finger from left to right can be a second element movement that defines a second gesture. These first and second elemental movements can further be combined into a third gesture where the index finger is pointed and then is moved from left to right. In this example, the first gesture (pointing an index finger) can be defined as a selection gesture that can initiate a first command for the media device 506, 512 to select an object or file using the user interface 404. The second gesture (moving a pointed index finger) can be defined as a movement gesture that can initiate a second command for the media device 506, 512 to move a previously selected object or file using the user interface 404. The combination, or third, gesture (pointing the index finger and then moving the pointed index finger from left to right) can be defined as the combination of the first and second commands such that an object or file is selected and then moved based on the recognition of this user movement as the third gesture. In one embodiment, the combination gesture can initiate a command that is different from the mere combination of the elemental commands.

The standard library of gestures can be directed to functions that control the user interface, manipulation of media content, and/or access to the media device 506, 512. For example, standard library gestures can be defined for navigation gestures, such as opening file folders, scrolling, selecting content, changing user interface windows, zooming, pinning applications or content, or traversing directories. Standard library gestures can be defined for retrieving or disposing documents, including selecting, moving, copying, opening, and printing documents. Standard library gestures can be defined for graphical functions such as drawing, selecting, moving, sizing, filling, and editing graphical objects.

In one embodiment, the set of stored gestures 418 can include custom gestures that can be defined on the media device 506, 512 or that can be copied from other media devices. In one embodiment, the media device 506, 512 can allow a user to associate elemental gestures or combination gestures from a standard gesture library with commands that differ from the commands defined in the standard gesture library. For example, the aforementioned gesture of pointing an index finger can be re-defined by the user to initiate a drawing command on the user interface 404. In another example, the combination gesture of pointing the index finger and then moving the pointed index finger from left to right can be defined as selecting and moving an object or file but can add an additional command of opening the object or file the location to which it has been moved. In one embodiment, the media device 506, 512 can support a custom gesture function that can capture a new user movement and assign this captured movement to an existing command or a new command. The new user movement can then be stored as a custom gesture.

Custom gestures can be modified entirely new gestures or versions of standard gestures. Custom gestures can be user-created gesture, combinations of standard gestures, combination of standard gestures with user-created gestures or combinations of user-created gestures. Custom gestures can use, combine, or alter standard commands. Custom gestures can be used to invoke canned communications. Custom gestures can be used to request or to command changes in how a media presentation is modified, translated, or adapted by a media presentation element or a user interface of the media device 506, 512.

Secret gestures can be included in the library of gestures 418 for the media device 506, 512. The secret gestures can be standard library gestures or can be custom gestures defined using the media device 506, 512. Secret gestures can be "secret" based on the ability of the user to initiate commands or communications that are concealed from others. For example, a specific movement, such as scratching the nose with two slow simultaneous blinks, can correspond to a custom gesture created by the user. When this secret gesture is detected, the media device 506, 512 can retrieve a secret command. For example, the media device 506, 512 can retrieve a command to send a canned message, such as "What's up?" to a known party. In one embodiment, secret messages can be directed to commands to control access to the media device 506, 512. For example, secret gestures can be used to login, logout, switch users, shut off a display for privacy, or shut down the media device. In one embodiment, secret gestures are directed to canned communications to over media devices 506, 512 or computing devices 108, 116. Secret gestures can initiate communications between colleagues and friend over email, social networking, or instant messaging. The secret gesture allows a user of the media device 506, 512 to communicate privately without the message appearing on the media device.

If the captured user movement matches a stored gesture in step 716, then a command corresponding to that stored gesture is retrieved in step 802. In one embodiment, the gestures and commands are in the same file or stream. In one embodiment, a video stream of a stored gesture can include the corresponding command as metadata in the stream. In one embodiment, a still image of a stored gesture can include the command in the file. In one embodiment, the gesture data and the command data can be stored and accessed from a common data base. In one embodiment, the commands and gestures are stored separately. When the captured video matches a stored gesture, then the corresponding command is retrieved using an index or other code associated with that stored gesture.

In step 804, the media device 506, 512 can select a second adaptation of the user interface of the media presentation element to modify the presentation of the media content according to the command to the media device. In step 806, the media device 506, 512 can modify the first modified presentation of the media content according to the second adaptation. In one embodiment, a gesture can be used to initiate a command that will alter the performance of the user interface 404. For example, at the beginning of a presentation of a television program on the user interface 404 of the media device 506, 512 a first adaptation can be made by the media device, based on the characteristics of the media device environment, as described in step 708. For example, the media device 506, 512 can select low backlighting and low audio volume. During the presentation, however, the user can decide that the audio volume needs to temporarily be muted. The user can make a "mute" gesture by, for example, placing index finger to lips (i.e., the universal "quiet" gesture). The media device 506, 512 can capture and compare the user's movement to the standard and custom libraries. When the media device 506, 512 finds a matching "quiet" gesture, the media device 506, 512 can retrieve a command to mute the volume on the user interface 404.

Figure 9:
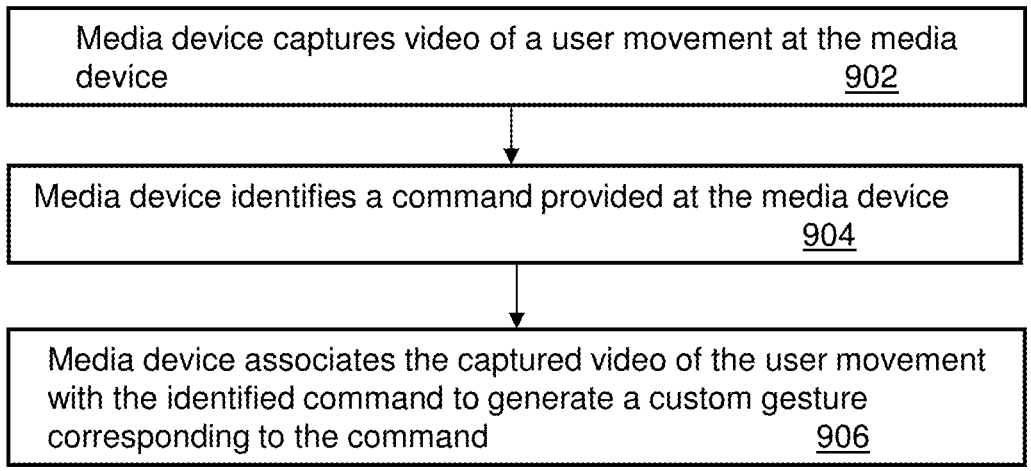

FIG. 9 depicts an illustrative method 900 that can operate in portions of the devices of FIGS. 1-6. The method 900 can be used to generate a custom command at the media device. Method 900 can begin with step 902 in which a media device 506, 512 can capture video of a user movement at the media device. In one embodiment, the user can cause the media device 506, 512 to enter a gesture programming mode. During gesture programming mode, the user can teach the media device 506, 512 a new gesture by performing a movement that is captured by the media device.

In step 904, the media device can identify a command provided at the media device. In one embodiment, a command selection and entry form is presented to the user via the user interface 404 of the media device 506, 512. The user can select a command from a listing of standard commands. The user can edit a standard command to create a custom command.

In step 906, the media device associates the captured video of the user movement with the identified command to generate a custom gesture corresponding to the command. After the new gesture is captured by the media device 506, 512, the user associates a command with the new gesture.

Figure 10:
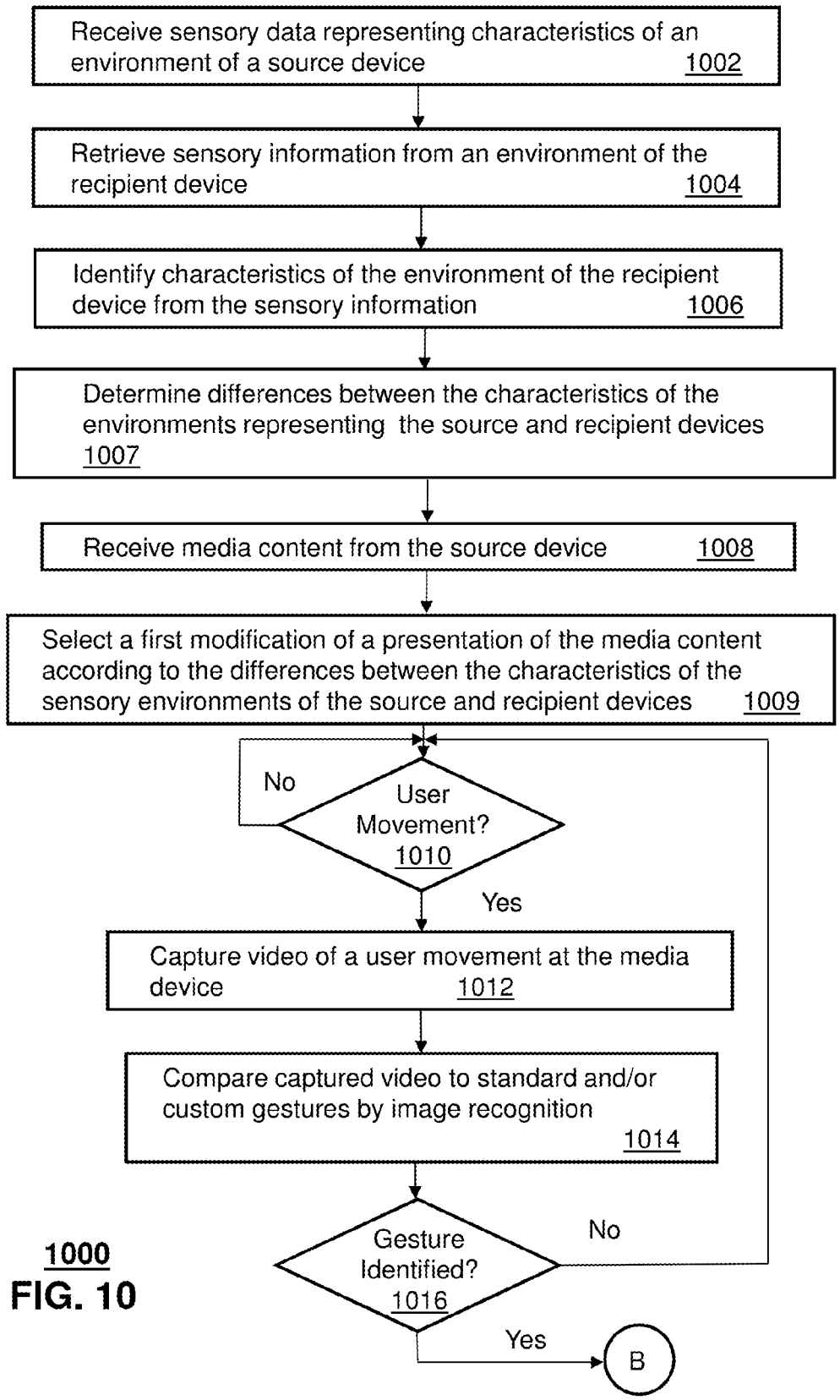
Figure 11:
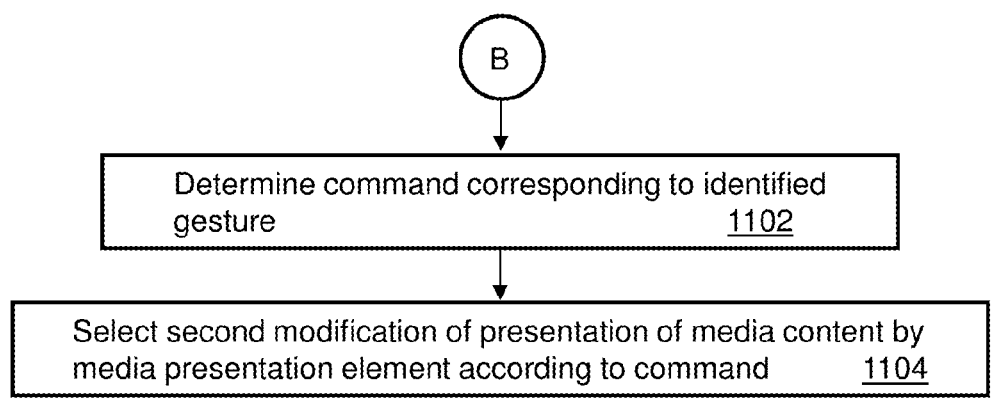

FIGS. 10-11 depict an illustrative method 1000 that operates in portions of the devices of FIGS. 1-6. Method 1000 can begin with step 1002 in which a recipient device 506, 514 can receive sensory data representing characteristics of an environment of a source device 512, 516. The recipient device 506, 514 can be a media processor 106, such as a set-top box. The media processor 106 can be connected to the communication system 100 via a gateway 104. The media processor 106 can deliver media content from the communication system 100 to a media device 108, such as a television or a computing device. The recipient device 506, 514 can be a portable communication device 116, such as a computing device, wireless computing device, or mobile communications device, and can receive media content from the communication system 100 via a mobility network. As with the recipient device 506, 514, the source device 512, 516 can also be a media processor 106, such as a set-top box, and can be connected to the communication system 100 via a gateway 104. The source device 512, 516 can be a portable communication device 116, such as a computing device, wireless computing device, or mobile communications device, and can receive media content from the communication system 100 via a mobility network. Sensory data can represent an environment 542, 546 of the source device 512, 516 or an environment 544, 548 of a recipient device 506, 514.

In step 1004, the recipient device 506, 514 can retrieve sensory information from an environment of the recipient device. The sensory information can represent a physical world or a virtual world of the recipient device. The sensory information can be collected and distributed similarly as the sensory data can be collected and distributed for a source device 512, 516, as described above. In one embodiment, the recipient device 506, 514 can capture temperature data by way of a temperature probe or can capture video data by way of a camera, as described above. In step 1006, the recipient device 506, 514 can identify characteristics of the environment of the recipient device from the retrieved sensory information. In one embodiment, the recipient device can determine a mean value or a range of values for temperature based on captured temperature data. The recipient device can convert captured video into a standard file format or into a series of still images.

In step 1007, the recipient device 506, 514 can determine differences between the characteristics of the environment of the source device 512, 516 and the characteristics of the environment of the recipient device. The recipient device 506, 512 can compare the set of characteristics representing the environment of the source device 512, 516 with the set of characteristics representing the environment of the recipient device. The recipient device 506, 514 can compare, for example, a physical environment at the source device 512, 516 with a physical environment at the recipient device 506, 514 by comparing the sensory data from each device. For example, the source device 512, 516 may report bright lighting conditions, such a sunshine, as exhibited by lighting intensity sensory data. By comparison, the recipient device 506, 514 may have identified low-level lighting conditions based on a cloudy day or nighttime or poor indoor lighting. The recipient device 506, 514 can compare the lighting conditions as like categories and detect the differences. Similarly, the recipient device 506, 514 can compare all of the other reported or identified physical sensory data for the two devices, such as temperature, background audio, location, and the like.

In one embodiment, the recipient device 506, 514 can detect that background walls at the location of the source device 512, 516 are different than those at the location of the recipient device. The recipient device 506, 514 can detect that the background walls at the location of the source device 512, 516 are smaller or shaped differently than those at the location of the recipient device. The recipient device 506, 514 can detect that the time zone at the location of the source device 512, 516 is different than the time zone at the location of the recipient device. The recipient device 506, 514 can detect that the source device 512, 516 is located at tropical latitude while the recipient device is located in a four-season climate that is currently experiencing winter conditions.

The recipient device 506, 514 can compare value or numerical-based sensory data, such a temperature or light intensity or location coordinates. The recipient device 506, 514 can also compare content-based sensory data, such as video, audio, or still image content to determine differences and can establish where these differences are attributable to the physical environments of the source device 512, 516 and the recipient device 506, 514. The recipient device 506, 514 can also compare presentation resources of the recipient device to those of the source device 512, 516. In one embodiment, the source device 512, 516 may have sophisticated surround sound audio resources, while the recipient device 506, 514 has stereo audio presentation resources. Additionally, the source device 512, 516 may have a high definition display resource, while the recipient device 506, 514 has a standard definition display resource.

In addition to comparing physical environments, the recipient device 506, 512 can compare virtual environments. In one embodiment, source device 512, 516 can be presenting a virtual-reality video game while recipient device 506, 514 can be presenting a virtual application featuring avatars and virtual persons. The source device 512, 516 and recipient device 506, 514 can each be presenting a different virtual world, each with a virtual environment made up of many characteristics, to the users of the respective devices. The recipient device 506, 512 can compare the set of characteristics representing the virtual environment of the source device 512, 516 with the set of characteristics representing the virtual environment of the recipient device In one embodiment, the source device 512, 516 may report virtual conditions of out-of-doors, darkness, and a storm in the virtual-reality game as exhibited by sensory data of virtual lighting intensity or virtual precipitation or virtual wind. By comparison, the recipient device 506, 514 may have identified low-lighting, but calm, indoor conditions, in the avatar-based game. The recipient device 506, 514 can compare the virtual lighting, weather, and location conditions as like virtual categories and detect differences. Similarly, the recipient device 506, 514 can compare all of the other reported or identified virtual sensory data for the two devices, such as aroma, background audio, images, and the like. The recipient device 506, 514 can determine differences and can establish where these differences are attributable to the virtual environments of the source device 512, 516 and the recipient device 506, 514.

In addition to comparing physical-to-physical and virtual-to-virtual environments, the recipient device 506, 514 can also compare physical-to-virtual and virtual-to-physical environments. In one embodiment, the recipient device 506, 514 can compare, for example, a physical environment reported from the source device 512, 516 with a virtual environment presented at the recipient device 506, 514 by comparing the environment characterizations of each device. A characteristic of the virtual environment presented on recipient device 506, 514 can be adapted to imitate a real-world, physical characteristic being experienced at the source device 512, 516. In one embodiment, the source device 512, 516 can be at a location experiencing a passing train that can be heard as audio and felt as vibration. Characteristics of audio and/or vibration can be reported from the source device 512, 516, such as by an audio MPEG file, a background noise measurement (frequency, amplitude), or a vibration reading (frequency, amplitude). The recipient device 506, 514 can compare the reported physical sensory data to characteristics of the virtual world presented by the recipient device. The virtual world, for example, can be presenting a noisy restaurant where characteristic components of noise and vibration have been simulated. The recipient device 506, 514 can compare the noise and vibration between the physical world where a train is passing and the virtual world of the restaurant and detect differences that can be important to adapting a media presentation from a physical location of the source device 512, 516 to the virtual "location" of the recipient device.

In step 1008, the recipient device 506, 514 can receive media content from the source device 512, 516. The media content can be a combination of content sourced from the service provider and content generated or modified by the source device 512, 516. The media content can be received by the recipient device 506, 514 directly from the source device 512, 516, can be received by the recipient device 506, 514 from the service provider networks 100-200, or can be received by the recipient device 506, 514 from the server 530.

In step 1009, the recipient device 506, 514 can select a first modification of a presentation of the media content according to differences between the characteristics of the environment of the source device 512, 516 and the characteristics of the environment of the recipient device 506, 514. In one embodiment, the recipient device 506, 514 can adapt a user interface 404 of the recipient device 506, 514 according to a difference, or combination of differences, between the characteristics of the environments of the source device 512, 516 and the recipient device. The recipient device 506, 514 can modify characteristics of a display 410 on a user interface 404 of the recipient device 506, 514 or of a user interface, such as display 508, in communication with the recipient device. In one embodiment, the source device 512, 516 can be located in bright conditions, while the recipient device 506, 514 is located in dark conditions. The recipient device 506, 514 can detect the difference in environment and adjusts settings on the display 404, 508, such as brightness, backlighting, or contrast. The recipient device 506, 514 can adjust an audio system 412 to account for difference in background noise between the recipient device and the source device 512, 516.

In one embodiment, the recipient device 506, 514 can modify the user interface 404 to account for differences between physical and virtual worlds or between two virtual worlds. In one embodiment, a user of the source device 512, 516, such as computing device, can be watching a music video within a virtual reality, avatar-based application presented on the computing device (e.g., the user's avatar is watching the video). The user can decide to share this virtual experience with someone else via a recipient device 506, 514 in the form of a mobile phone. The user of the user of the source device 512, 516 can initiate a sharing of the music video content with the user of the recipient device 506, 514 by, in one embodiment, sending a text with a link that directs the recipient device 506, 514 to the source device 512, 516. The recipient device 506, 514 can receive the music video (media content) from the source device 512, 516 along with sensory data representing the virtual environment that the source device 512, 516 is presenting. The recipient device 506, 514 can compare the received, virtual environment characteristics of the source device 512, 516 with retrieved and identified characteristics of the physical environment of the recipient device 506, 514. The recipient device 506, 514 can determine, for example, that the virtual world presentation of the music video includes a background sound of a virtual fountain. The recipient device 506, 514 can alter the audio system 412 of the mobile phone to account for the presence of the fountain at the source device 512, 516 either by adding a fountain sound to a reproduction of the music video through the mobile phone audio system 412 (to share the complete experience of the source device user) or by reducing the playback volume of the music video through the audio system (to account for a quieter listening environment for the recipient device user).

The recipient device 506, 514 can translate or transcode the media content according to the differences between the characteristics of the environment of the source device 512, 516 and the characteristics of the environment of the recipient device 506, 514. The recipient device 506, 514 can modify the format of the media content, can change the encoding scheme used for the media content, or can alter the media content to account for the detected environment differences when the media content presented by or on the recipient device 506, 514. In one embodiment, the source device 512, 516 can be presenting a live cam video feed of a flock of penguins in Antarctica to a user who is riding on a subway train. The user of the source device 512, 516 decides to share this television show with a user of a recipient device 506, 514. The recipient device 506, 514 can be presenting, at the same time, a virtual reality application where the user of the recipient device 506, 514 is "living" in a virtual city. The user of the recipient device 506, 514 can be attending a football game in the virtual-reality city. A scoreboard at the virtual football game can be used to display video. Various physical world phenomena at the source device 512, 516 can be retrieved by the recipient device 506, 514 as sensory data characterizing the source device environment. The recipient device 506, 514 can detect differences between the source and recipient devices. In one embodiment, the recipient device 506, 514 can transcode the media content from the source device 512, 516 to work in the virtual environment by converting from a streaming video format to an embedded video format, such as Flash™ video, a trademark of the Adobe Corporation of San Jose, Calif.

In another illustration, the media content can be in the form of content of a virtual reality world being presented on the source device 512, 516. In one embodiment, the source device 512, 516 can be presenting a virtual reality application where an avatar of a user "lives" in a house. The house can have elements of home décor such as paintings, wall colors, and landscaping. The user decides to share her home in her virtual reality application with a user of the recipient device 506, 514, who is also a "resident" in a virtual reality application. In the context of the virtual reality application, the décor elements can be identified as characteristics of the environment of the user of the source device 512, 516. Therefore, the recipient device 506, 514 can receive the décor elements as characteristics of the source device virtual environment and compare these characteristics to the virtual environment of the recipient device 506, 514. The user of the recipient device 506, 514 can have different décor—paintings, colors, landscaping—at his house. The recipient device 506, 514 can detect these differences and alter the content of the first user's house, as presented to the second user at the recipient device 506, 514. The recipient device 506, 514 can translate the first house by substituting part of the content of the second house (to make the second user feel more at home in his friend's house).

If the media device detects a user movement in step 1010, then the media device can capture video of the user movement at the media device in step 1012. In step 1014, the media device can compare the captured video of the user movement at the media device. If the media device identifies a gesture from the captured video of the user movement by image recognition in step 1016, then the media device can retrieve a command to the media device corresponding to the identified gesture in step 1102. In step 1104, the media device can select a second modification of the user interface of the media presentation element to modify the presentation of the media content according to the command to the media device.

Figure 12:
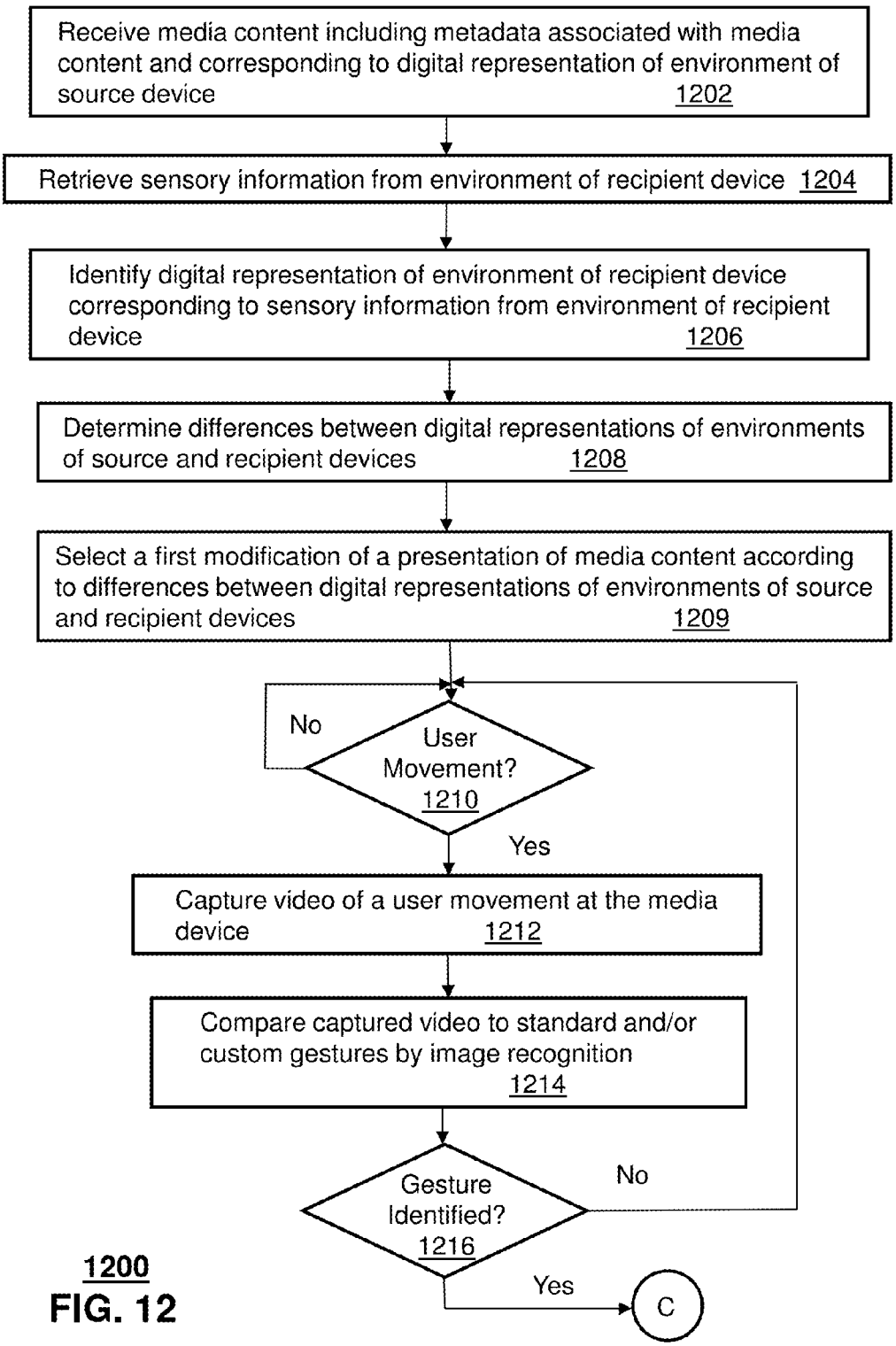
Figure 13:
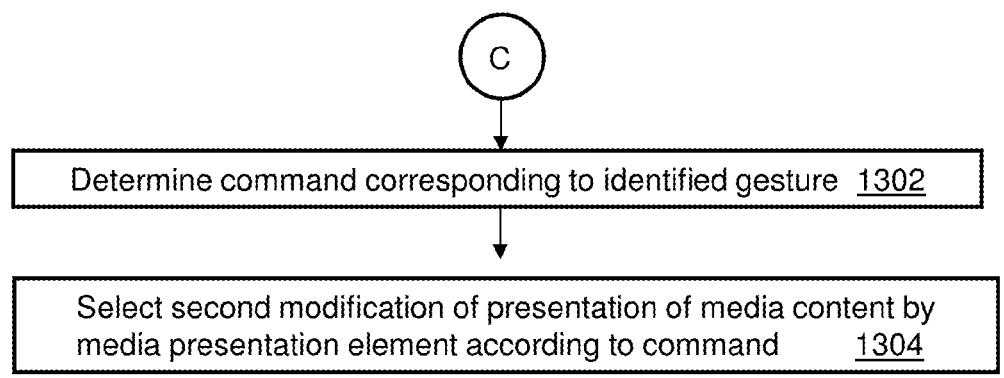

FIGS. 12-13 depict an illustrative method 1200 that can operate in portions of the devices of FIGS. 1-6. Method 1200 can begin with step 1202 in which a recipient device 506, 514 can receive media content from a source device 512, 516. The media content from the source device 512, 516 can include metadata corresponding to a digital representation of an environment 542, 546 of the source device 512, 516. The sensory data representing the environment of the source device 512, 516 can be included with the media content as metadata. The metadata can provide information on the media content. In this case, the metadata can correspond to sensory data collected for an environment of the source device 512, 516, where the environment can be a physical or virtual environment a user of the source device would experience as part of the media content. For example, the temperature at the source device can be measured and saved. A user would experience the collected temperatures while viewing media content at the source device. A metadata descriptor of labeled "average temperature" can be created, or tagged, to correspond to a calculated mean value for the collected temperature readings taken at the source device. Similarly, a metadata descriptor of "hourly temperatures" can be tagged to correspond to each hourly value of the set of collected temperatures. Tagging the various sensory data measurement into metadata can be used to provide an infrastructure for sending and receiving the sensory data in a standardized format along with the media content.

If the media content can be streamed from the source device 512, 516 to the server 530 or to the recipient device 506, 514, the tagged metadata can be included within a header, or overhead, section of the data stream. If the media content is sent from the source device 512, 516 to the server 530 or the recipient device 506, 514 as a discrete file or series of files, the metadata can be included as a part of one or more of the files or as a separate file. By sending the metadata within the media content data structure, the metadata is automatically included with the media content. Error detection and/or correction techniques, applicable to the streaming or file-based media content data, can be automatically applied on the metadata.

The metadata can be defined as a series of data fields or elements included in an overhead section or file of the media content data. The metadata can be included with the media content using metadata containers which can encapsulate a set of metadata as a group. The metadata containers can be defined according to standard formats, such as the American National Standards Institute (ANSI) standard. The environmental metadata can be included in metadata containers along with other metadata elements associated with media content. For example, the metadata for the sensory data can be included with metadata storing information on copyright owner, artist, data, or genre of the media content. The metadata can be included as encoded data. The metadata can be encrypted.

Individual metadata elements can be used to create a digital representation of the overall environment of the source device 512, 516. For example, the metadata descriptors for temperature, such as average temperature and hourly temperature, can be combined with similar metadata descriptors for time of day, date, location, color, location details, and other data collected from the physical or virtual environment. The combination of several or all of the metadata descriptors can be used to establish a digital environment for the source device 512, 516. That is, the set of metadata can provide a combination of environmental factors sufficient to describe an overall source device environment. The set of metadata descriptors can be described as a digital representation, or digital model, of the environment. When the set of metadata is sent along with the media content, a digital representation of the environment of the source device 512, 516 is thereby provided within the media content.

In step 1204, the recipient device 506, 514 can retrieve sensory information from an environment 544, 548 of the recipient device. The sensory information can represent a physical world or a virtual world of the recipient device. The sensory information can be collected by means similar to the sensory data of the source device 512, 516, as described above. For example, the recipient device 506, 514 can capture temperature data by way of a temperature probe or can capture video data by way of a camera, as described above In step 1206, the recipient device 506, 514 can identify a digital representation of the environment of the recipient device 506, 514 corresponding to the sensory information from the environment 544, 548 of the recipient device. As with the source device 512, 516, the recipient device 506, 514 can tag sensory data measured at the recipient device into metadata descriptors. Tagging the sensory data to metadata can allow the recipient device 506, 514 to share the environmental data with other devices in the same metadata format as used by the source device 512, 516. For example, the recipient device can determine a mean value or a range of values for temperature based on captured temperature data. In another example, the recipient device can convert captured video into a standard file format or into a series of still images. The recipient device 506, 514 can then use a set of all of the metadata descriptors to establish a digital environment for the recipient device 506, 514. That is, the set of metadata can provide a combination of environmental factors sufficient to describe an overall recipient device environment. The set of metadata descriptors can be described as a digital representation, or digital model, of the recipient device environment.

In step 1208, the recipient device 506, 514 can determine differences between the digital representation of the environment of the source device 512, 516 and the digital representation of the environment of the recipient device. The recipient device 506, 512 can compare a set of metadata collected from the environment of the source device 512, 516 with a set of sensory information collected the environment of the recipient device. The recipient device 506, 514 can compare, for example, a physical environment at the source device 512, 516 with a physical environment at the recipient device 506, 514 by comparing the metadata descriptors from each device. For example, the source device 512, 516 may report bright lighting conditions, such a sunshine, as exhibited by lighting intensity sensory data. By comparison, the recipient device 506, 514 may have identified low-level lighting conditions based on a cloudy day or nighttime or poor indoor lighting. The recipient device 506, 514 can compare the lighting conditions as like categories and detect the differences. Similarly, the recipient device 506, 514 can compare all of the other reported or identified physical sensory data for the two devices, such as temperature, background audio, location, and the like.

In step 1209, the recipient device 506, 514 can select a first modification of a presentation of the media content according to differences between the digital representation of the environment of the source device 512, 516 and the digital representation of the environment of the recipient device 506, 514. In one embodiment, the recipient device 506, 514 can adapt a user interface 404 of the recipient device 506, 514 according to a difference, or combination of differences, between the digital representations of the environments of the source device 512, 516 and the recipient device. In one embodiment, the recipient device 506, 514 can modify the user interface 404 to account for differences between physical and virtual worlds or between two virtual worlds. In one embodiment, the recipient device 506, 514 can translate or transcode the media content according to the differences between the digital representation of the environment of the source device 512, 516 and the digital representation of the environment of the recipient device 506, 514 in step 916.

If the media device can detect a user movement in step 1210, then the media device captures video of the user movement at the media device in step 1212. In step 1214, the media device can compare the captured video of the user movement at the media device. If the media device can identify a gesture from the captured video of the user movement by image recognition in step 1216, then the media device can retrieve a command to the media device corresponding to the identified gesture in step 1302. In step 1304, the media device selects a second modification of the presentation of the media content according to the command to the media device.

Figure 14:
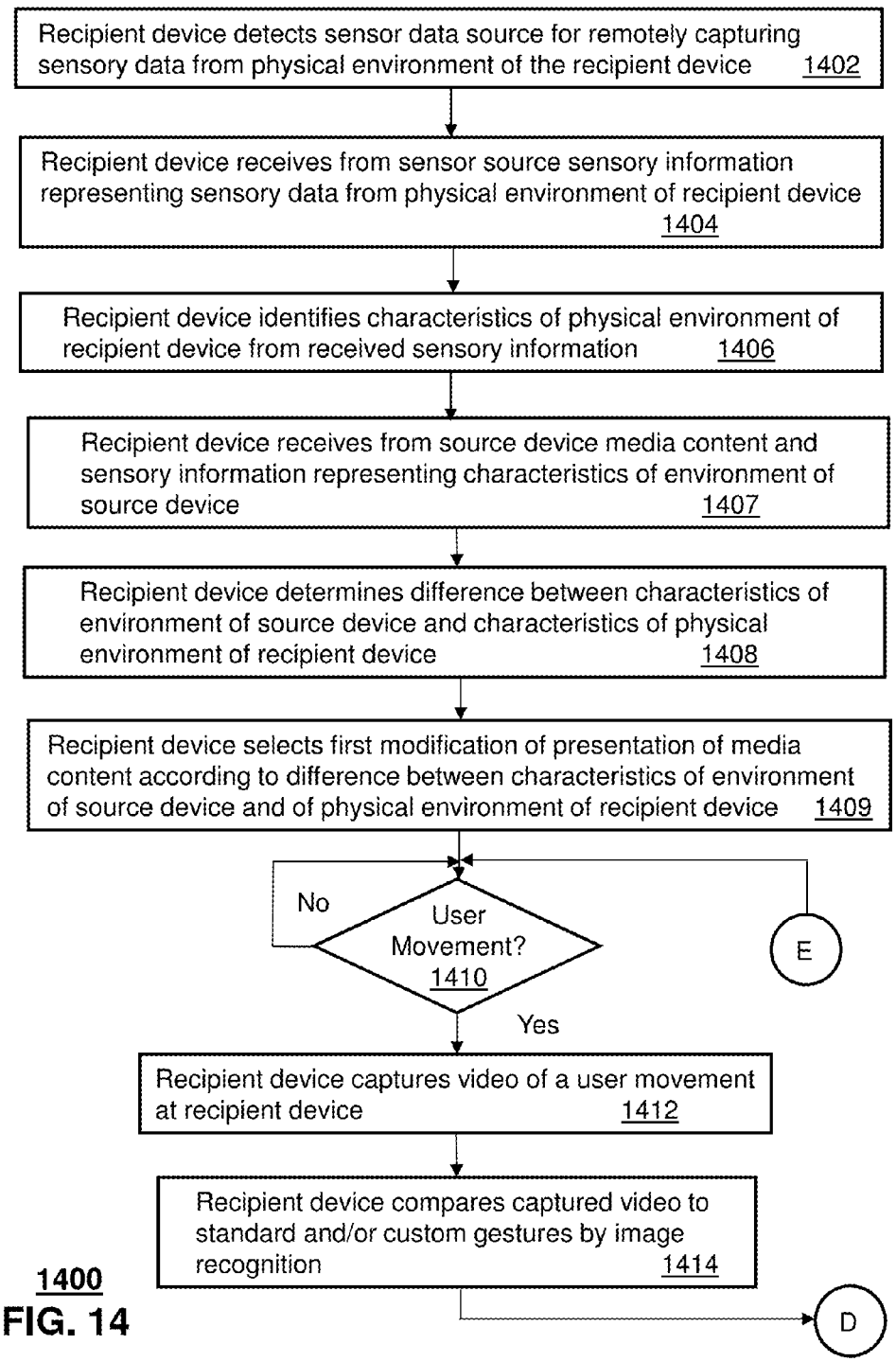
Figure 15:
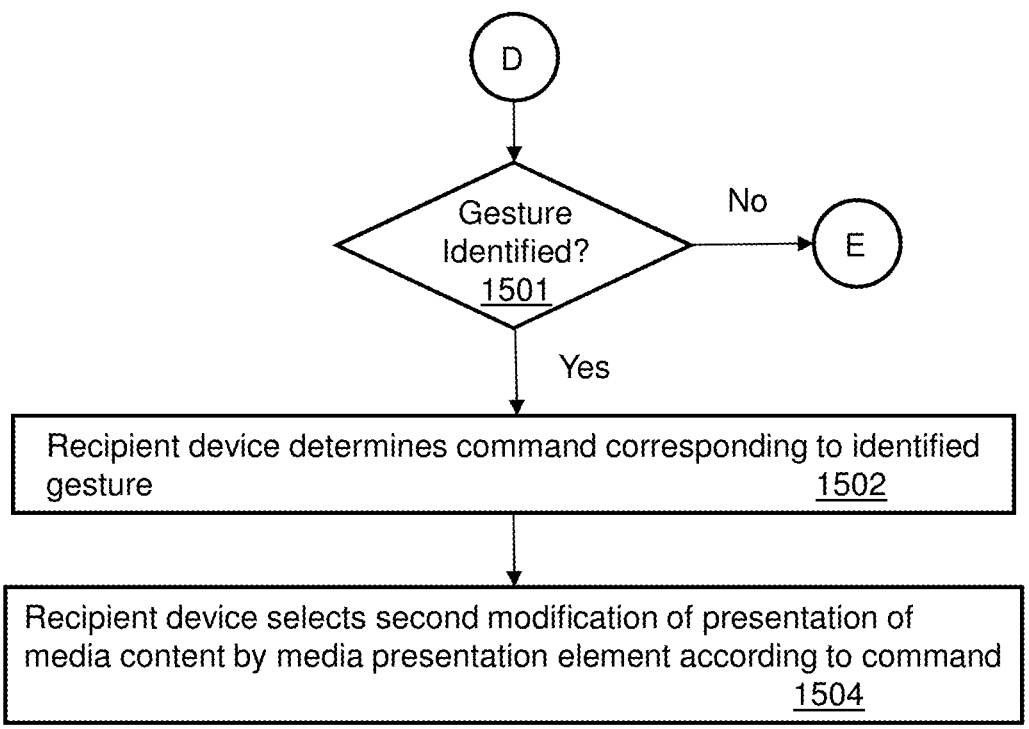

FIGS. 14-15 depict an illustrative method 1400 that can operate in portions of the devices of FIGS. 1-6. Method 1400 can begin with step 1402 in which a recipient device 604 can detect a sensor data source 614 for remotely capturing sensory data from a physical environment of the recipient device. In step 1404, the recipient device 604 can receive from a sensor data source 614, 624, and 634 sensory information representing the sensory data from the physical environment of the recipient device. In one embodiment, a media processor device 604 and 644, such as the recipient device 604 or a source device 644, can detect a sensor data source 614, 624 and 634 capable and willing to share sensory data that has been captured by the sensor data source in the same environment as the source device or recipient device. In one embodiment, the media processor device 604 and 644 can broadcast a request for sensory data to any sensor data sources 614, 624 and 634 in the same environment as the media processor device. In one embodiment, the request can be a radio frequency message. The media processor device 604 can send out a message using, for example, short range radio frequency in the scientific, medical, and industrial (SFI) band. The media processor device 604 and 644 can send the message on Wi-Fi or Bluetooth communications link. In one embodiment, the media processor device 604 and 644 can send out a radio frequency signal capable of reading passive radio frequency identification (RFID) tags on the sensor data sources 614, 624 and 634.

In one embodiment, the media processor device 604 and 644 can send a request message over a cellular network, a wired network, or an internet protocol capable network. The request message can include information identifying the media processor device 604 and 644. In one embodiment, the request message can include a media access control (MAC) address of the media processor device. The request message can further include information to identify a service provider of the media processor device 604 and 644. The request message can further include information to identify a group that is sharing sensory data. The request message can further include information to identify a specific type or identity of sensory data needed by the media processor device 604 and 644 or if the media processor device will accept any available data from a sensor data source 614, 624 and 634. The request message can be in the form of a request to create a communications link between the media processor device 604 and 644 and an available sensor data source 614, 624 and 634 or the message can be a continuation of communications from an already established link.

In one embodiment, the media processor device 604 and 644 can receive a response sent from any of the sensor data sources 614, 624 and 634 offering the sensory data. The response can include information about the capabilities of the sensor data sources 614, 624 and 634, their respective locations, their service provider, whether they are authorized to share sensory data, or any other relevant information which can be useful to the media processor device 604 and 644. The response can be sent and received over the same medium as was used by the media processor device 604 and 644 to send the request message. So, for example, the media processor device 604 and 644 can send a request message by way of short range RF communication. The sensor data sources 614, 624 and 634 then responds via the same short range RF. The response can be sent by way of a different medium. For example, where the media processor device 604 and 644 sends a request message that is capable of reading a RFID tag, the response can be a combination of the RFID reading (identifying the sensor data sources 614, 624 and 634) and a message in another medium, such as short range RF that includes further information on a specific sensor data source 614, 624 and 634.

The sensory information can simply be a digital data reading from a sensor 616, 626 and 636. The sensory information can be a set of data readings, such as several different types of sensory data collected by a single sensor data source 614, 624 and 634 or a series of data points for a single specific sensory data type that have been collected over time. The sensory information can be the products of a statistical analysis of sensory data readings, such as an average value or a weighted average or a moving average.

In one embodiment, a sensor data source 614, 624 and 634 broadcasts an offer of sensory data to any media processor device 604 and 644 nearby. The request can be a radio frequency message. The sensor data source 614, 624 and 634 can send out a message using, for example, short range radio frequency band, Wi-Fi, or Bluetooth. In one embodiment, the sensor data source 614, 624 and 634 can send out a radio frequency signal capable of reading passive radio frequency identification (RFID) tags on the media processor device 604 and 644.

The sensor data source 614, 624 and 634 can send the message over a cellular network, a wired network, or an internet protocol capable network. The request message can include information identifying the sensor data source 614, 624 and 634. In one embodiment, the request message can include a media access control (MAC) address of the sensor data source 614, 624 and 634. The request message can further include information to identify a service provider of the sensor data source 614, 624 and 634. The request message can further include information to identify a group that is sharing sensory data. The request message can further include information to identify a specific type or identity of sensory data offered by the sensor data source 614, 624 and 634. The request message can be in the form of a request to create a communications link between the sensor data source 614, 624 and 634 and any available media processor device 604 and 644 or the message can be a continuation of communications from an already established link.

In one embodiment, any of the media processor devices 604 and 644 can send a response to the offering sensor data source 614, 624 and 634 accepting the offer of the sensory data. The acceptance response can be sent and received over the same medium as was used by the sensor data source 614, 624 and 634 to send the offering message. So, for example, the sensor data source 614, 624 and 634 can send a message offering sensory data by way of short range RF communication. The media processor device 604 and 644 can then respond via the same short range RF. Alternatively, the response can be sent by way of a different medium. For example, where the sensor data source 614, 624 and 634 sends a request message that is capable of reading a RFID tag, the response can be a combination of the RFID reading (identifying the media processor device 604 and 644) and a message in another medium, such as short range RF that includes further information on a media processor device 604 and 644.

In one embodiment, the media processor device 604 and 644 can receive sensory information representing sensory data from the sensor data source 614, 624 and 634. The sensory information can simply be a digital data reading from a sensor 616, 626 and 636. The sensory information can be a set of data readings, such as several different types of sensory data collected by a single sensor data source 614, 624 and 634 or a series of data points for a single specific sensory data type that have been collected over time. The sensory information can be the products of a statistical analysis of sensory data readings, such as an average value or a weighted average or a moving average.

In step 1406, the recipient device 506, 514 can identify characteristics of the physical environment of the recipient device from the received sensory information. The recipient device 506, 514 can identify characteristics of the environment of the recipient device from the retrieved sensory information. For example, the recipient device can determine a mean value or a range of values for temperature based on captured temperature data. The recipient device can convert captured video into a standard file format or into a series of still images.

In step 1407, the recipient device 506, 514 can receive from a source device 512, 516 media content and sensory information representing characteristics of an environment of the source device. In step 1408 the recipient device can determine at least one difference between the characteristics of the environment of the source device and characteristics of the physical environment of the recipient device. In step 1409, the recipient device can select a first modification of a presentation of the media content according to the at least one difference between the plurality of characteristics of the environment of the source device and the plurality of characteristics of the physical environment of the recipient device.

If the media device detects a user movement in step 1410, then the media device can capture video of the user movement at the media device in step 1412. In step 1414, the media device can compare the captured video of the user movement at the media device. If the media device identifies a gesture from the captured video of the user movement by image recognition in step 1501, then the media device can retrieve a command to the media device corresponding to the identified gesture in step 1502. In step 1504, the media device can select a second modification of the presentation of the media content according to the command to the media device.

Upon reviewing the aforementioned embodiments, it would be evident to an artisan with ordinary skill in the art that said embodiments can be modified, reduced, or enhanced without departing from the scope and spirit of the claims described below. In one embodiment, the media device 506, 512 can use object recognition applications to compare known patterns, objects, shapes, sounds, and/or places that appear in the video, audio, or still image content reported or identified as being of the source device 512, 516 and/or the recipient device 506, 514. By comparing recognized objects, patterns, shapes, sounds, and/or places, differences in the environments of the source device 512, 516 and the recipient device 506, 514 can be determined to guide modification of the media content or of the user interface of the recipient device 506, 514. In one embodiment, a media device 506, 512 can further be adapted to detect a voice command and to combine the detected voice command with a detected gesture-based command. In another embodiment, the media device 506, 512 can be further adapted to provide a set of custom gestures to another media device or to a server 530. In another embodiment, the media device 506, 512 can be adapted to include a gestures-off state where capture of video data of the user is turned off.

Figure 16:
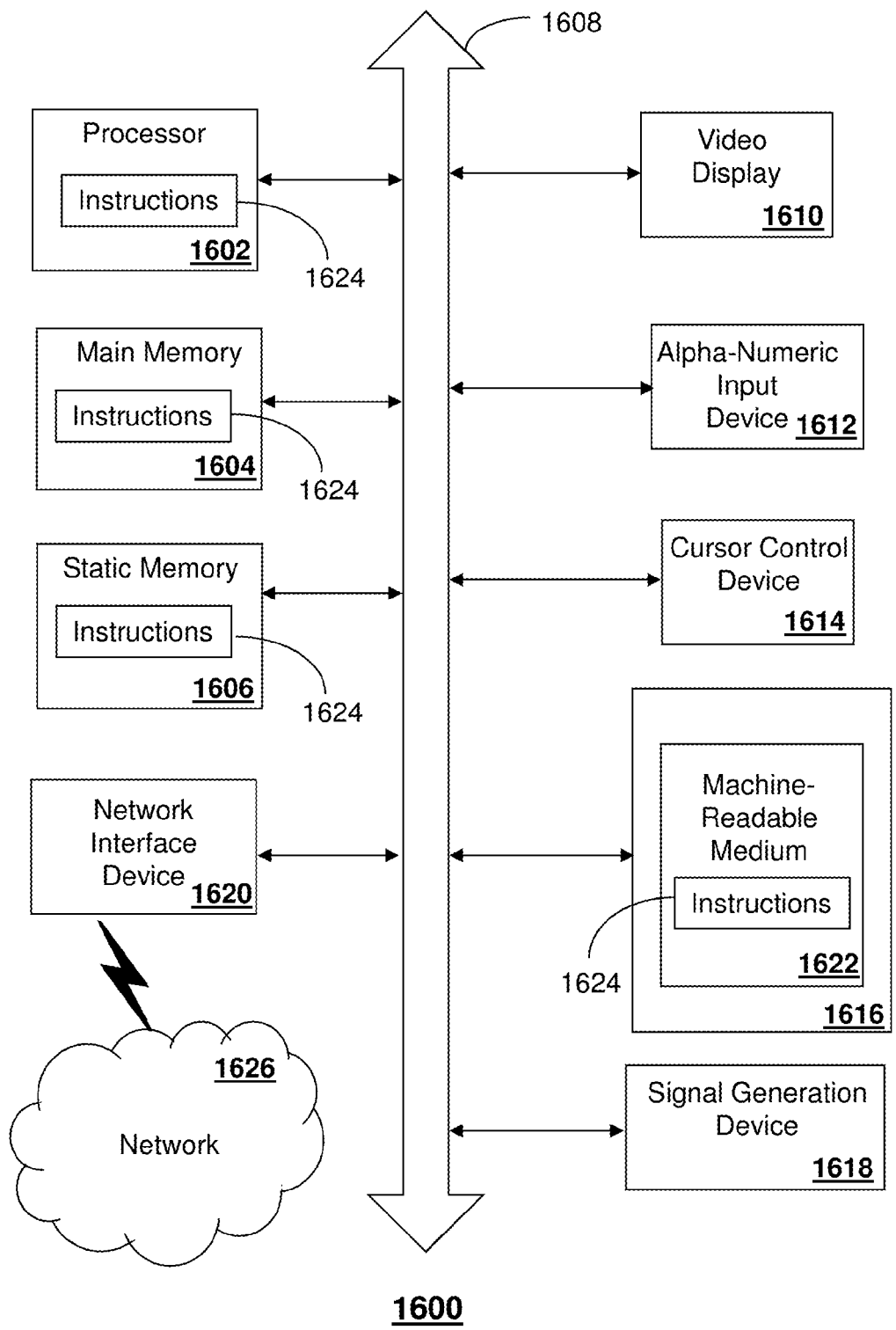
FIG. 16 is a diagrammatic representation of a machine in the form of a computer system within which a set of instructions, when executed, may cause the machine to perform any one or more of the methods discussed herein.

FIG. 16 depicts an exemplary diagrammatic representation of a machine in the form of a computer system 1600 within which a set of instructions, when executed, may cause the machine to perform any one or more of the methods discussed above. One or more instances of the machine can operate, for example, as the server 503, the media processor 506, the display 508, computing devices 512, mobile devices 514, or combinations thereof as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1600 may include a processor 1602 (e.g., a central processing unit (CPU), a graphics processing unit (GPU), or both), a main memory 1604 and a static memory 1606, which communicate with each other via a bus 1608. The computer system 1600 may further include a video display unit 1610 (e.g., a liquid crystal display (LCD), a flat panel, or a solid state display. The computer system 1600 may include an input device 1612 (e.g., a keyboard), a cursor control device 1614 (e.g., a mouse), a disk drive unit 1616, a signal generation device 1618 (e.g., a speaker or remote control) and a network interface device 1620.

The disk drive unit 1616 may include a tangible computer-readable storage medium 1622 on which is stored one or more sets of instructions (e.g., software 1624) embodying any one or more of the methods or functions described herein, including those methods illustrated above. The instructions 1624 may also reside, completely or at least partially, within the main memory 1604, the static memory 1606, and/or within the processor 1602 during execution thereof by the computer system 1600. The main memory 1604 and the processor 1602 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. In one embodiment, therefore, it is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 1622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 1600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media device, comprising:
   a memory that stores executable instructions;
   a media presentation element to present media content; and
   a processor coupled to the memory and the media presentation element, wherein the processor, responsive to executing the executable instructions, performs operations comprising:
   identifying first characteristics of a first environment of the media device according to first sensory information, wherein the first sensory information comprises an ambient condition of a space in which the media device operates;
   identifying second characteristics of a second environment of a source device according to descriptive information, wherein the source device provides the media content;
   determining a difference between the first characteristics of the first environment and the second characteristics of the second environment;
   selecting a first adaptation to modify a presentation of the media content by the media presentation element according to the difference;
   modifying the presentation of the media content by the media presentation element according to the first adaptation to generate a first modified presentation of the media content;
   identifying a command from a series of gestures of user movement;
   selecting a second adaptation to modify the presentation of the media content at the media presentation element according to the command; and
   modifying the first modified presentation of the media content according to the second adaptation to generate a second modified presentation of the media content.

2. The media device of claim 1, wherein the operations further comprise:
   identifying the series of gestures from captured video of the user movement by image recognition; and
   comparing the series of gestures to a plurality of predetermined gestures, wherein each of the plurality of predetermined gestures corresponds to a predetermined command of a plurality of predetermined commands.

3. The media device of claim 2, wherein the media content, the plurality of predetermined gestures, and the plurality of predetermined commands are provided by a service provider by way of a communication system that is communicatively coupled to the media device.

4. The media device of claim 2, wherein the plurality of predetermined gestures comprise one of a navigation gesture, a retrieval gesture, a drawing gesture, a disposal gesture, or a combination thereof.

5. The media device of claim 1, wherein the operations further comprise comparing the series of gestures to a plurality of custom gestures created at the media device.

6. The media device of claim 5, wherein individual commands corresponding to individual gestures of the series of gestures are different from the command.

7. The media device of claim 1, wherein the series of gestures comprises an undisclosed gesture created at the media device, wherein the undisclosed gesture corresponds to an undisclosed command, and wherein the undisclosed command is associated with a process comprising one of a process to login at the media device, a process to disable a presentation at the media device, a process to shut down the media device, a process to communicate privately between the media device and a second device, or a combination thereof.

8. The media device of claim 1, wherein the first environment of the media device comprises a virtual environment.

9. A non-transitory machine-readable storage medium, comprising executable instructions that, when executed by a processor, cause the processor to perform operations comprising:
   receiving media content from a source device;
   determining a first characteristic of a first environment according to sensory information indicating an ambient condition of a first space in which one of the processor or the source device operates;
   determining a second characteristic of a second environment comprising an ambient condition of a second space in which another one of the processor or the source device operates;
   determining a difference between the first characteristic of the first environment and the second characteristic of the second environment;

modifying the media content to generate first updated media content according to the difference;

identifying a single command corresponding to a series of gestures determined from images of user movement; and modifying the first updated media content according to the single command to generate second updated media content.

10. The non-transitory machine-readable storage medium of claim 9, wherein the series of gestures correspond to a plurality of predetermined gestures, and wherein the single command corresponds to one of a plurality of predetermined commands.

11. The non-transitory machine-readable storage medium of claim 10, wherein the plurality of predetermined gestures and the plurality of predetermined commands are supplied by a communication system as a gesture and command library.

12. The non-transitory machine-readable storage medium of claim 10, wherein the plurality of predetermined gestures comprise one of a navigation gesture, a retrieval gesture, a drawing gesture, a disposal gesture, or a combination thereof.

13. The non-transitory machine-readable storage medium of claim 9, wherein the operations further comprise:

retrieving a modification profile according to the single command; and updating the first updated media content according to the modification profile.

14. The non-transitory machine-readable storage medium of claim 9, wherein a message corresponding to the series of gestures is not displayed by the processor.

15. A method, comprising:

receiving, by a recipient device comprising a processor, media content supplied by a source device;

determining, by the recipient device, a first characteristic of a first environment according to sensory information indicating an ambient condition of a first space in which one of the processor or the source device operates;

determining, by the recipient device, a second characteristic of a second environment comprising an ambient condition of a second space in which another one of the processor or the source device operates;

determining, by the recipient device, a difference between the first characteristic of the first environment and the second characteristic of the second environment;

modifying, by the recipient device, the media content to generate first updated media content according to the difference;

identifying, by the recipient device, a single command from a series of gestures determined from images; and modifying, by the recipient device, the first updated media content to generate second updated media content according to the single command.

16. The method of claim 15, wherein the first environment is a virtual environment for presenting the media content.

17. The method of claim 15, wherein the series of gestures comprises one of a navigation gesture, a retrieval gesture, or a combination thereof.

18. The method of claim 15, further comprising comparing, by the recipient device, the series of gestures to a plurality of gestures to identify the single command from a corresponding plurality of commands.

19. The method of claim 15, wherein a message corresponding to the series of gestures is not displayed by the processor.

20. The method of claim 15, wherein the series of gestures comprises one of a drawing gesture, a disposal gesture, or a combination thereof.

* * * * *